US012762188B2

(12) United States Patent
Serdiukova et al.

(10) Patent No.: US 12,762,188 B2
(45) Date of Patent: Oct. 13, 2026

(54) TECHNIQUES FOR AUTOMATIC SUBJECT LINE GENERATION

(71) Applicant: Salesforce, Inc., San Francisco, CA (US)

(72) Inventors: Vera Serdiukova, Mountain View, CA (US); Tong Niu, San Jose, CA (US); Yingbo Zhou, Palo Alto, CA (US); Amrutha Krishnan, San Bruno, CA (US); Abigail Kutruff, New York, NY (US); Allen Hoem, Indianapolis, IN (US); Matthew Wells, Indianapolis, IN (US); Andrew Hoblitzell, Greenwood, IN (US); Swetha Pinninti, Zionsville, IN (US); Brian Brechbuhl, Carmel, IN (US); Annie Zhang, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 69 days.

(21) Appl. No.: 18/326,124

(22) Filed: May 31, 2023

(65) Prior Publication Data

US 2024/0303280 A1 Sep. 12, 2024

Related U.S. Application Data

(60) Provisional application No. 63/488,721, filed on Mar. 6, 2023.

(51) Int. Cl.
*G06F 16/903* (2019.01)

(52) U.S. Cl.
CPC .............................. *G06F 16/90344* (2019.01)

(58) Field of Classification Search
CPC ................................................ G06F 16/90344
(Continued)

(56) References Cited

U.S. PATENT DOCUMENTS 8,886,576 B1 * 11/2014 Sanketi .................. G06N 20/00 706/47
9,129,214 B1 * 9/2015 Gomez-Uribe .......... G06N 7/01
(Continued)

OTHER PUBLICATIONS

Ippolito et al., "Comparison of Diverse Decoding Methods from Conditional Language Models", Jun. 14, 2019, 11 pages printed (Year: 2019).*
(Continued)

*Primary Examiner* — Tony Mahmoudi
*Assistant Examiner* — Michael Le
(74) *Attorney, Agent, or Firm* — Holland & Hart, LLP.

(57) ABSTRACT

A method for data processing is described. The method includes receiving an indication of a reference string from a cloud client of a content generation service. The method further includes generating multiple candidate strings associated with the reference string based on using a machine learning model to calculate similarity metrics between the reference string and the multiple candidate strings, where the machine learning model is trained using a dataset of annotated strings. The method further includes selecting a quantity of the candidate strings based on filtering the multiple candidate strings according to the similarity metrics. The method further includes causing the quantity of candidate strings to be displayed at the cloud client. The method further includes receiving feedback associated with the quantity of candidate strings and a selection of at least one candidate string displayed at the cloud client.

17 Claims, 12 Drawing Sheets

(58) Field of Classification Search
USPC .......................................................... 707/726
See application file for complete search history.

(56) References Cited

U.S. PATENT DOCUMENTS 9,619,450 B2 * 4/2017 Alfonseca ............. G06F 40/258
9,756,063 B1 * 9/2017 Chung .................. G06F 21/552
10,067,986 B1 * 9/2018 Thapliyal ............. G06F 16/906
10,812,449 B1 * 10/2020 Cholleton ........... H04L 61/3025
11,080,483 B1 * 8/2021 Islam .................... G06F 40/284
11,269,898 B1 * 3/2022 Salaka ................... G06N 20/20
12,169,768 B1 * 12/2024 Cholleton ........... H04L 61/4511
2008/0208567 A1 * 8/2008 Brockett ............... G06F 40/253 704/9
2009/0171947 A1 * 7/2009 Karayel ............ G06F 16/90344 707/999.005
2009/0319927 A1 * 12/2009 Beeman ................ G06F 40/226 715/764
2011/0231405 A1 * 9/2011 Herbrich ........... G06F 16/24573 707/748
2014/0337331 A1 * 11/2014 Hassanzadeh ........ G06F 16/273 707/726
2015/0379127 A1 * 12/2015 Mueller .............. G06F 16/2468 707/741
2016/0171115 A1 * 6/2016 Jheeta ................... G06F 16/951 707/723
2016/0179835 A1 * 6/2016 Mika ................... G06F 16/9535 707/794
2017/0032035 A1 * 2/2017 Gao ......................... G06N 3/08
2017/0171151 A1 * 6/2017 Raemy .................... G10L 15/10
2018/0121825 A1 * 5/2018 Kumar .................... G06F 40/56
2018/0212926 A1 * 7/2018 Cholleton ........... H04L 61/3025
2018/0285326 A1 * 10/2018 Goyal ................... G06F 40/197
2018/0285928 A1 * 10/2018 Kirmani .................. G06F 16/00
2018/0308003 A1 * 10/2018 Singh ..................... G06N 20/00
2018/0357332 A1 * 12/2018 Fan ....................... G06F 16/334
2019/0122236 A1 * 4/2019 Terry .................. G06F 16/3344
2019/0325066 A1 * 10/2019 Krishna .............. G06F 16/3347
2019/0332946 A1 * 10/2019 Han ....................... G06N 5/022
2020/0026767 A1 * 1/2020 Chen ..................... G06F 16/345
2020/0349208 A1 * 11/2020 Bajaj ..................... G06F 16/951
2020/0351241 A1 * 11/2020 Bajaj ................... G06F 16/9535
2020/0356363 A1 * 11/2020 Dewitt ....................... G06F 8/75
2021/0174025 A1 * 6/2021 Hu ........................ G06F 40/284
2021/0241073 A1 * 8/2021 Fuchs ...................... G06N 3/09
2021/0264233 A1 * 8/2021 Gronát ................ G06F 18/2113
2021/0357382 A1 * 11/2021 Rishi ................... G06F 16/9538
2021/0390267 A1 * 12/2021 Wang .................... G06F 16/345
2022/0067284 A1 * 3/2022 He ........................ G06F 16/345
2023/0077608 A1 * 3/2023 Achiwa ................ G06V 30/413 382/229
2023/0199117 A1 * 6/2023 Koul .................. H04M 3/5183 379/201.01
2023/0205774 A1 * 6/2023 Elluru ............... G06F 16/24578 707/728
2023/0342559 A1 * 10/2023 Bhardwaj .............. G06N 20/00
2023/0419027 A1 * 12/2023 Pang ..................... G06F 40/216
2024/0054187 A1 * 2/2024 Nozawa ................. G06Q 10/06
2024/0054539 A1 * 2/2024 Ekfeldt ................. G06F 40/253
2024/0104055 A1 * 3/2024 McAnallen ........... G06F 16/164
2024/0220082 A1 * 7/2024 Katta .................... G06F 16/906
2024/0232512 A9 * 7/2024 Saha ..................... G06F 40/289

OTHER PUBLICATIONS

Mao et al., "Chinese Text Paraphrase Recognition Based on OpenPrompt Introducing Hybrid Prompts", International Conference on Cloud Computing, Performance Computing, and Deep Learning (CCPCDL 2022), 6 pages printed, 2022 (Year: 2022).*
Liu et al., "GPT Understands, Too", arXiv:2103.10385v1, Mar. 18, 2021, 10 pages (Year: 2021).*
Gu et al., "PPT: Pre-trained Prompt Tuning for Few-Shot Learning", arXiv:2109.04332v3, Mar. 14, 2022, 14 pages (Year: 2022).*

* cited by examiner

300

TECHNIQUES FOR AUTOMATIC SUBJECT LINE GENERATION

CROSS REFERENCES

The present Application for Patent claims priority to U.S. Provisional Application No. 63/488,721 by Serdiukova et al., entitled "TECHNIQUES FOR AUTOMATIC SUBJECT LINE GENERATION," filed Mar. 6, 2023, which is assigned to the assignee hereof and expressly incorporated herein by reference in its entirety.

FIELD OF TECHNOLOGY

The present disclosure relates generally to database systems and data processing, and more specifically to techniques for automatic subject line generation.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing, and preparing communications, and tracking opportunities and sales.

The cloud platform may support a variety of marketing tools that enable cloud clients to develop, test, and distribute marketing content at scale. In some cases, however, users may have to create marketing content by hand, which can result in delays, errors, etc.

DETAILED DESCRIPTION

Figure 1:
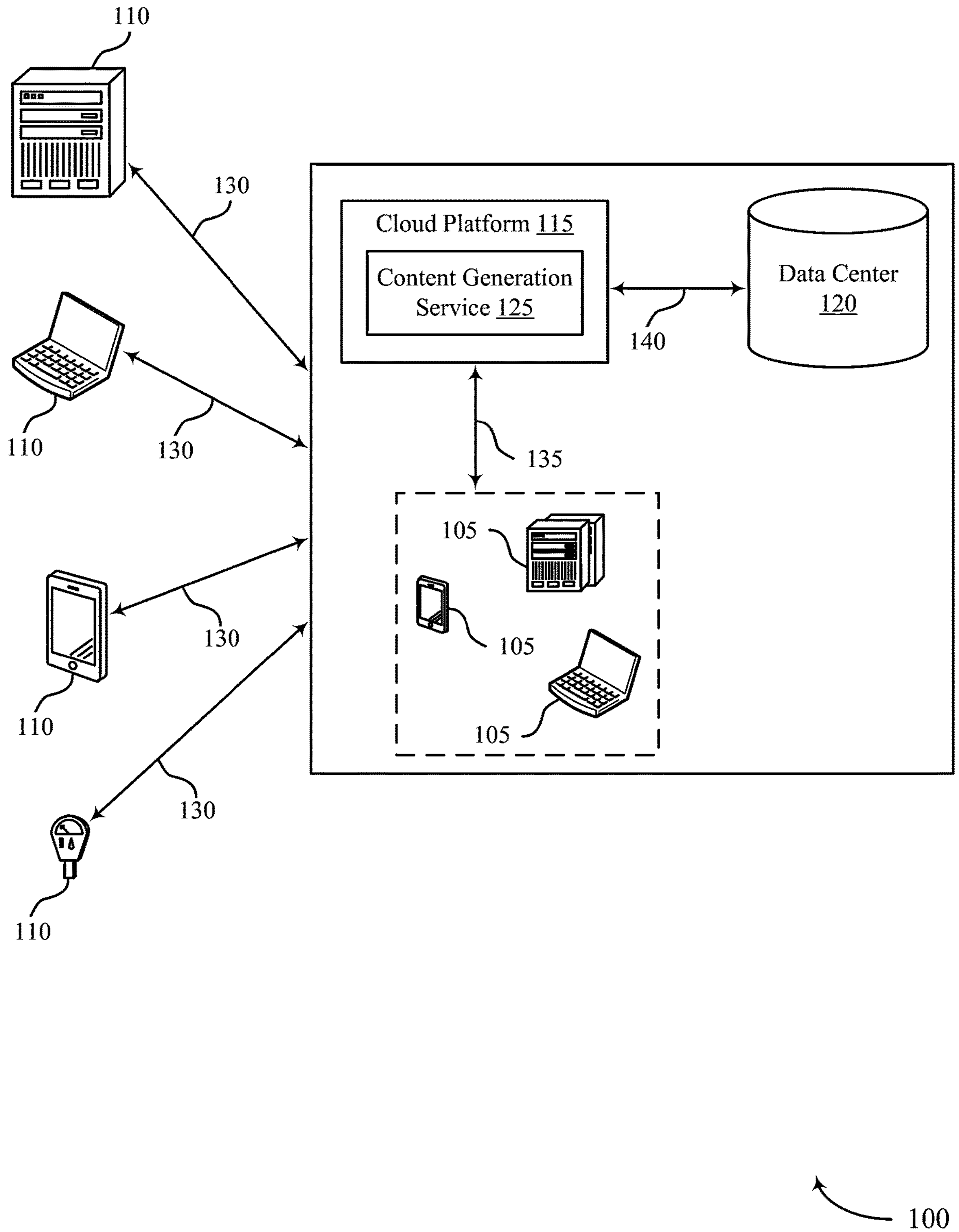
FIGS. 1 and 2 show examples of data processing systems that support techniques for automatic subject line generation in accordance with aspects of the present disclosure.

A cloud platform may support a variety of services that leverage artificial intelligence (AI), natural language processing (NLP), computer vision, and automatic speech recognition to provide cloud clients with customer insights, predictions, recommendations, etc. These marketing services may improve the efficiency and efficacy with which cloud clients (such as marketing users) interact with their customers. For example, the cloud platform may support marketing automation tools that enable cloud clients to develop and execute marketing campaigns across different outlets (e.g., email, mobile, advertising, websites). The cloud platform may also provide access to analytic tools that enable cloud clients to track and predict the performance of ongoing marketing campaigns.

A cloud client may use the cloud platform to develop and distribute content (e.g., emails, posts, advertisements) to customers as a part of a marketing campaign. In some cases, the cloud client may send multiple versions of the same content item to different groups of customers to determine which version receives the most favorable response (i.e., the most clicks or interactions). The process of sending multiple variants of the same item to assess customer response is generally referred to as A/B testing. However, conventional A/B testing schemes may be time-consuming and manually intensive, as marketers are often required to develop each version (i.e., variant) by hand. For example, if a cloud client would like to determine which email subject line will elicit the best customer response, the cloud client may be required to manually devise a number of subject line variants. Furthermore, the cloud client may be unable to use historic A/B testing data to improve or predict the performance of subsequent A/B testing processes.

Aspects of the present disclosure support techniques for using a combination of sampling algorithms and machine learning techniques to automatically generate candidate strings (for example, subject lines) based on a reference string provided by a cloud client. In accordance with the techniques described herein, a cloud client may input a reference string (i.e., a sequence of keywords or phrases) via a user interface or an application programming interface (API). Accordingly, a content generation service (also referred to herein as a subject line generator) may use a machine learning model to generate a list of candidate strings that correspond to the reference string. The machine learning model may generate the candidate strings by comparing attributes (i.e., semantic properties) of the reference string to attributes of annotated strings (such as user-curated subject lines) in a training dataset. After generating the candidate strings, the content generation service may filter and/or rank the candidate strings before presenting one or more of the candidate strings to the cloud client.

The machine learning model may use a variety of similarity metrics to evaluate (i.e., score) the performance of each candidate string. For example, the machine learning model may calculate a BERT-score for a candidate string by performing token-level comparisons between the candidate string and the reference (i.e., input) string. The machine learning model may also calculate a surface form dissimilarity factor between the candidate string and the reference string by performing character-level comparisons between the candidate string and the reference string. Additionally, or alternatively, the machine learning model may calculate the length consistency between the candidate string and the reference string by comparing the number of words or characters in the candidate string to the number of words or characters in the reference string.

After presenting one or more of the candidate strings to the cloud client via the user interface or the API, the cloud client may be prompted to provide feedback to the content generation service. For example, a user may be able to click or select different icons (i.e., thumbs up, thumbs down) to indicate positive or negative feedback for a candidate string. In some implementations, the user may be presented with a dropdown menu that includes a list of potential feedback options. If the user selects or interacts with one of the feedback options, the content generation service may use the feedback provided by the user to update or refine the machine learning model (so the user receives more helpful suggestions in the future). The techniques described herein may improve the performance and efficiency of marketing activities by providing users with a way to quickly create and test subject lines.

Aspects of the disclosure are initially described in the context of data processing systems, flow diagrams, user interfaces, and process flows. Aspects of the disclosure are further illustrated by and described with reference to apparatus diagrams, system diagrams, and flowcharts that relate to techniques for automatic subject line generation.

FIG. 1 illustrates an example of a data processing system 100 for cloud computing that supports techniques for automatic subject line generation in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction 130. The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server, a laptop, a smartphone, or a sensor. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120. Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

The data processing system 100 may include cloud clients 105, cloud platform 115, and data center 120. In some cases, data processing may occur at any of the components of the data processing system 100, or at a combination of these components. In some cases, servers may perform the data processing. The servers may be a cloud client 105 or located at data center 120.

The data processing system 100 may be an example of a multi-tenant system. For example, the data processing system 100 may store data and provide applications, solutions, or any other functionality for multiple tenants concurrently. A tenant may be an example of a group of users (e.g., an organization) associated with a same tenant identifier (ID) who share access, privileges, or both for the data processing system 100. The data processing system 100 may effectively separate data and processes for a first tenant from data and processes for other tenants using a system architecture, logic, or both that support secure multi-tenancy. In some examples, the data processing system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the data processing system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the data processing system 100 may support any configuration for providing multi-tenant functionality. For example, the data processing system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The data processing system 100 may support scaling of tenants within the multi-tenant system, for example, using scale triggers, automatic scaling procedures, scaling requests, or any combination thereof. In some cases, the data processing system 100 may implement one or more scaling rules to enable relatively fair sharing of resources across tenants. For example, a tenant may have a threshold quantity of processing resources, memory resources, or both to use, which in some cases may be tied to a subscription by the tenant.

In accordance with aspects of the present disclosure, a content generation service 125 supported by the cloud platform 115 may receive an indication of a reference string from a cloud client 105. Accordingly, the content generation service 125 may generate multiple candidate strings associated with the reference string based on using a machine learning model to calculate similarity metrics between the reference string and the candidate strings, where the machine learning model is trained using a dataset of annotated strings. The content generation service 125 may select a quantity of the candidate strings based on filtering the candidate strings according to the similarity metrics. The content generation service 125 may cause the quantity of candidate strings to be displayed via a user interface (such as the user interface 500 described with reference to FIG. 5) or an API. The content generation service 125 may receive, from the cloud client 105, feedback associated with the quantity of candidate strings and a selection of at least one candidate string.

Aspects of the data processing system 100 may be implemented to realize one or more of the following advantages. The techniques described with reference to FIG. 1 may enable cloud clients 105 to generate, select, and test candidate subject lines with greater efficiency and reduced manual interaction, among other benefits. For example, the content generation service 125 may use various machine learning techniques to generate, filter, and rank candidate subject lines on the basis of semantic similarity and/or predicted performance. As such, the described techniques may improve the process of creating marketing content by providing cloud clients 105 (i.e., marketing users) with engaging and performant content. Moreover, the content generation service 125 may use feedback provided by the cloud clients 105 to update or refine the machine learning algorithms used to generate candidate subject lines, thereby enabling the content generation service 125 to provide more pertinent suggestions in subsequent iterations.

It should be appreciated by a person skilled in the art that one or more aspects of the disclosure may be implemented in a data processing system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
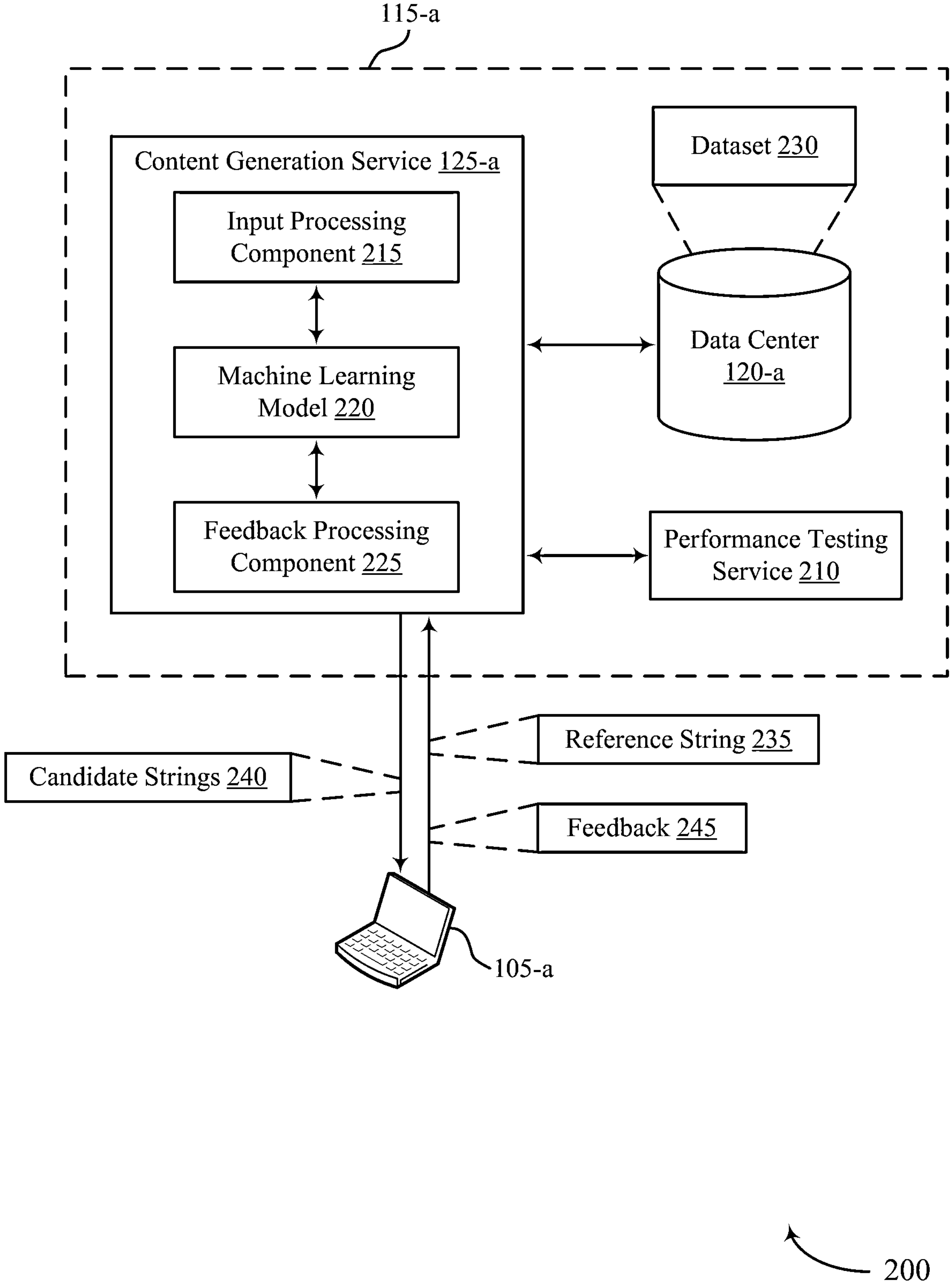

FIG. 2 shows an example of a data processing system 200 that supports techniques for automatic subject line generation in accordance with aspects of the present disclosure. The data processing system 200 may implement or be implemented by aspects of the data processing system 100. For example, the data processing system 200 includes a cloud platform 115-*a*, which may be an example of the cloud platform 115 described with reference to FIG. 1. The cloud platform 115-*a* may support a content generation service 125-*a*, which may be an example of the content generation service 125 described with reference to FIG. 1. The cloud platform 115-*a* may also support or otherwise include a data center 120-*a* (e.g., the data center 120 described with reference to FIG. 1) and a performance testing service 210.

As described herein, the cloud platform 115-*a* may support a variety of services that leverage AI, NLP, computer vision, and automatic speech recognition to provide the cloud client 105-*a* with customer insights, predictions, recommendations, etc. These marketing services may improve the efficiency and efficacy with which the cloud client 105-*a* (such as a marketing user) interacts with customers. For example, the cloud platform 115-*a* may support marketing automation tools that enable the cloud client 105-*a* to develop and execute marketing campaigns across numerous platforms (e.g., email, mobile, advertising, websites). The cloud platform 115-*a* may also provide access to analytic tools (such as the performance testing service 210) that enable the cloud client 105-*a* to track and predict the performance of marketing campaigns.

The cloud client 105-*a* may use the cloud platform 115-*a* to develop and distribute content (e.g., emails, posts, advertisements) to customers as a part of a marketing campaign. In some cases, the cloud client 105-*a* may send multiple versions of the same content item to different groups of customers to determine which version receives the most favorable response (i.e., the most clicks or interactions). The process of sending multiple variants of the same item to assess customer response is generally referred to as A/B testing. However, conventional A/B testing schemes may be time-consuming and manually intensive, as marketers are often required to develop each version (i.e., variant) by hand. For example, to determine which email subject line will elicit the best customer response, the cloud client 105-*a* may have to manually create a number of subject line variants. Furthermore, the cloud client 105-*a* may be unable to use historic A/B testing data to improve or predict the performance of each variant.

The data processing system 200 may support techniques for using a combination of sampling algorithms and machine learning techniques to automatically generate candidate strings 240) (for example, subject lines) based on a reference string 235 provided by the cloud client 105-*a*. In accordance with the techniques described with reference to FIG. 2, the cloud client 105-*a* may input the reference string 235 (i.e., a sequence of keywords or phrases) via a user interface (such as the user interface 500 described with reference to FIG. 5). Accordingly, the content generation service 125-*a* (also referred to herein as a subject line generator) may use the machine learning model 220 to generate a list of candidate strings 240) that correspond to the reference string 235. The machine learning model 220 may generate the candidate strings 240) by using an input processing component 215 to compare attributes (i.e., semantic properties) of the reference string 235 to attributes of annotated strings (such as user-curated subject lines) in a training dataset 230. After generating the candidate strings 240), the content generation service 125-*a* may filter and/or rank the candidate strings 240 before presenting one or more of the candidate strings 240 to the cloud client 105-*a* via the user interface.

The machine learning model 220 may use a variety of similarity metrics to evaluate (i.e., score) the correlation between the candidate strings 240 and the reference string 235. For example, the machine learning model 220 may calculate respective BERT-scores for the candidate strings 240 (where BERT stands for Bidirectional Encoder Representations from Transformers) by performing token-level comparisons between the candidate strings 240) and the reference string 235. The machine learning model 220 may also calculate respective surface form dissimilarity factors between the candidate strings 240 and the reference string 235 by performing character-level comparisons between the candidate strings 240 and the reference string 235. Additionally, or alternatively, the machine learning model 220 may calculate the length consistency between the candidate strings 240 and the reference string 235 by comparing the number of words or characters in the candidate strings 240 to the number of words or characters in the reference string 235.

After presenting one or more of the candidate strings 240 to the cloud client 105-*a* via the user interface, the cloud client 105-*a* may be prompted to provide feedback 245 to the content generation service 125-*a*. For example, a user may be able to click or select different icons (i.e., thumbs up, thumbs down) to indicate positive or negative feedback for a candidate string. In some implementations, the user interface may include a dropdown menu with a list of potential feedback options. If the user selects or interacts with one of the feedback options, a feedback processing component 225 of the content generation service 125-*a* may store and use the feedback 245 provided by the user to update or refine the machine learning model 220 (so the user receives more helpful suggestions in the future).

In some examples, the cloud client 105-*a* may select one or more of the candidate strings 240 for further testing and/or analysis. Accordingly, the performance testing service 210 (also referred to herein as a subject line tester) may determine predicted engagement rates for the selected candidate strings using historic A/B testing data. For example, the performance testing service 210 may compare the selected candidate strings to other strings (i.e., prior subject lines) with similar formats, properties, and/or keywords to predict the relative engagement rate(s) of the selected candidate strings (i.e., below-average, average, above-average). In some examples, the performance testing service 210 may present the predicted engagement rate(s) to the cloud client 105-*a* via a user interface (such as the user interface 600 described with reference to FIG. 2).

Figure 3:
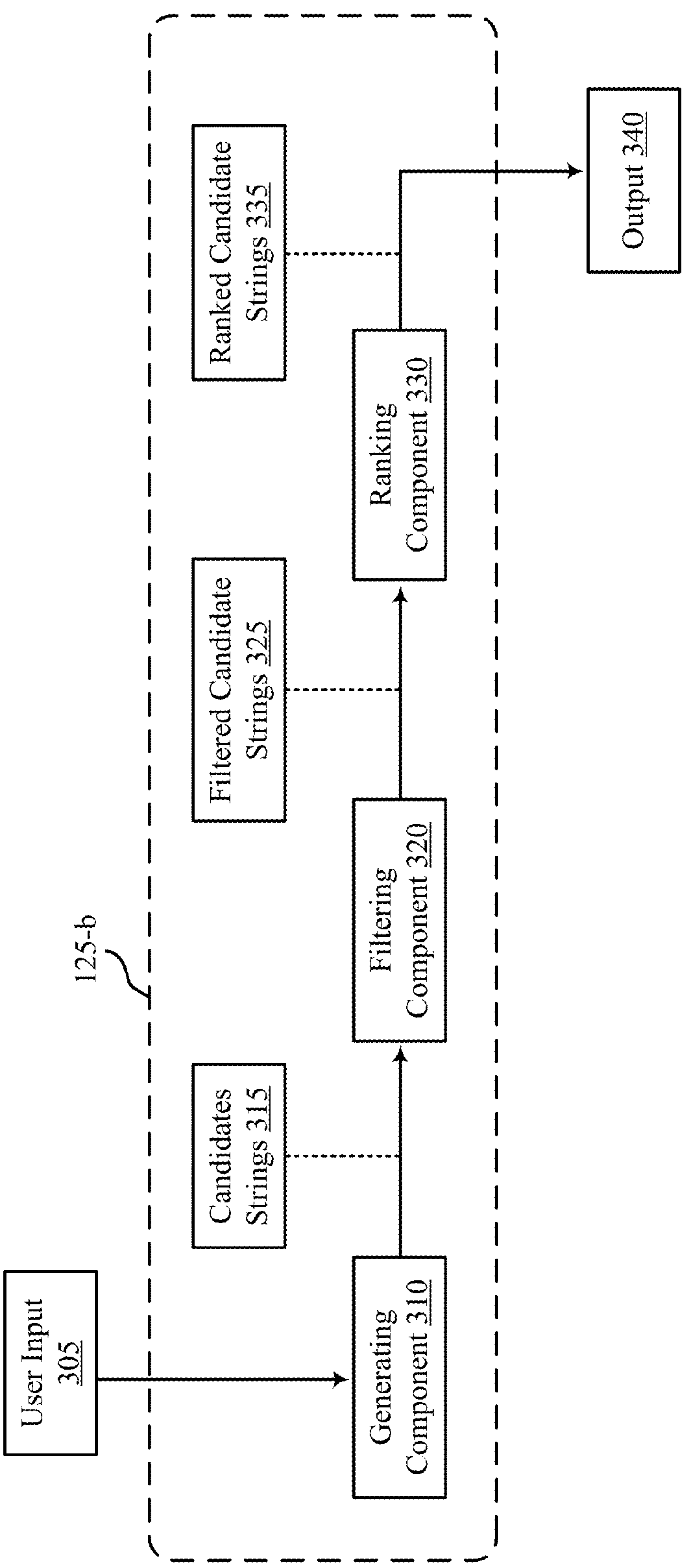
FIGS. 3 and 4 show examples of flow diagrams that support techniques for automatic subject line generation in accordance with aspects of the present disclosure.

FIG. 3 shows an example of a flow diagram 300 that supports techniques for automatic subject line generation in accordance with aspects of the present disclosure. The flow diagram 300 may implement or be implemented by aspects of the data processing system 100 or the data processing system 200. For example, the flow diagram 300 may be implemented by a content generation service 125-*b*, which may be an example of the content generation service 125-*a* described with reference to FIG. 2. The content generation service 125-*b* includes a generating component 310, a filtering component 320, and a ranking component 330, which may be elements of the machine learning model 220 described with reference to FIG. 2. The flow diagram 300 illustrates the process by which the content generation service 125-*b* may generate an output 340 (i.e., a set of candidate subject lines) based on a user input 305 (i.e., a reference subject line).

As described herein, a user may enter a suitable subject line (e.g., the user input 305), such as a previous subject line or a best-effort subject line. Afterwards, the user may click generate, and the subject line generator (e.g., the content generation service 125-*b*) may output new subject lines (such as 5 candidate subject lines). After generating the subject lines (e.g., the output 340), the user may provide the AI with feedback on the subject lines, for example, by interacting with a thumbs up icon, a thumbs down icon, and/or by providing unstructured feedback in a text prompt. Other forms and mechanisms for providing feedback are also contemplated within the scope of the present disclosure.

The user may select one, several, or all of the subject lines to be copied, downloaded to their local machine, or tested for predicted performance (for example, using the performance testing service 210 described with reference to FIG. 2). By using the content generation service 125-*b* to generate subject lines, users (such as the cloud client 105-*a* described with reference to FIG. 2) may be able to quickly test the performance of automatically-generated subject lines. As described herein, the subject line generator may be trained using a dataset of curated data (e.g., 24,000 curated data points) that emphasizes marketing style and tone. The subject line generation techniques described herein may combine model training/distillation with a backbone model. The base model training set may include, for example, 8000 subject lines written by marketing professionals. The backbone model may be a large language model (such as CodeGen-nl) with 16B parameters. Model compression (i.e., distillation) may involve converting the 16B parameter model into another model.

In the example of FIG. 3, a user of the content generation service 125-*b* may enter a user input 305 (i.e., a reference string that includes a best-effort subject line). The generating component 310 may parse/process the user input 305 and generate candidate strings 315 using elements from the user input 305 and/or elements from annotated strings in a user-curated dataset (such as the dataset 230 described with reference to FIG. 2). As described herein, the user-curated dataset may be devoid of customer data, thereby ensuring that sensitive data is not accidentally exposed or surfaced to the user. The generating component 310 may also use pseudo-data to generate the candidate strings 315.

Accordingly, the generating component 310 may provide the candidate strings 315 to the filtering component 320, which may use various language models to filter the candidate strings 315 on the basis of semantic similarity, surface form dissimilarity, length consistency, etc. In some examples, the filtering component 320 may filter the candidate strings 315 by tuning or weighting different similarity factors. The filtering component 320 may provide the filtered candidate strings 325 to the ranking component 330, which may use soft majority voting (among other techniques) to rank the filtered candidate strings 325. The ranked candidate strings 335 may then be provided to the user.

Figure 4:
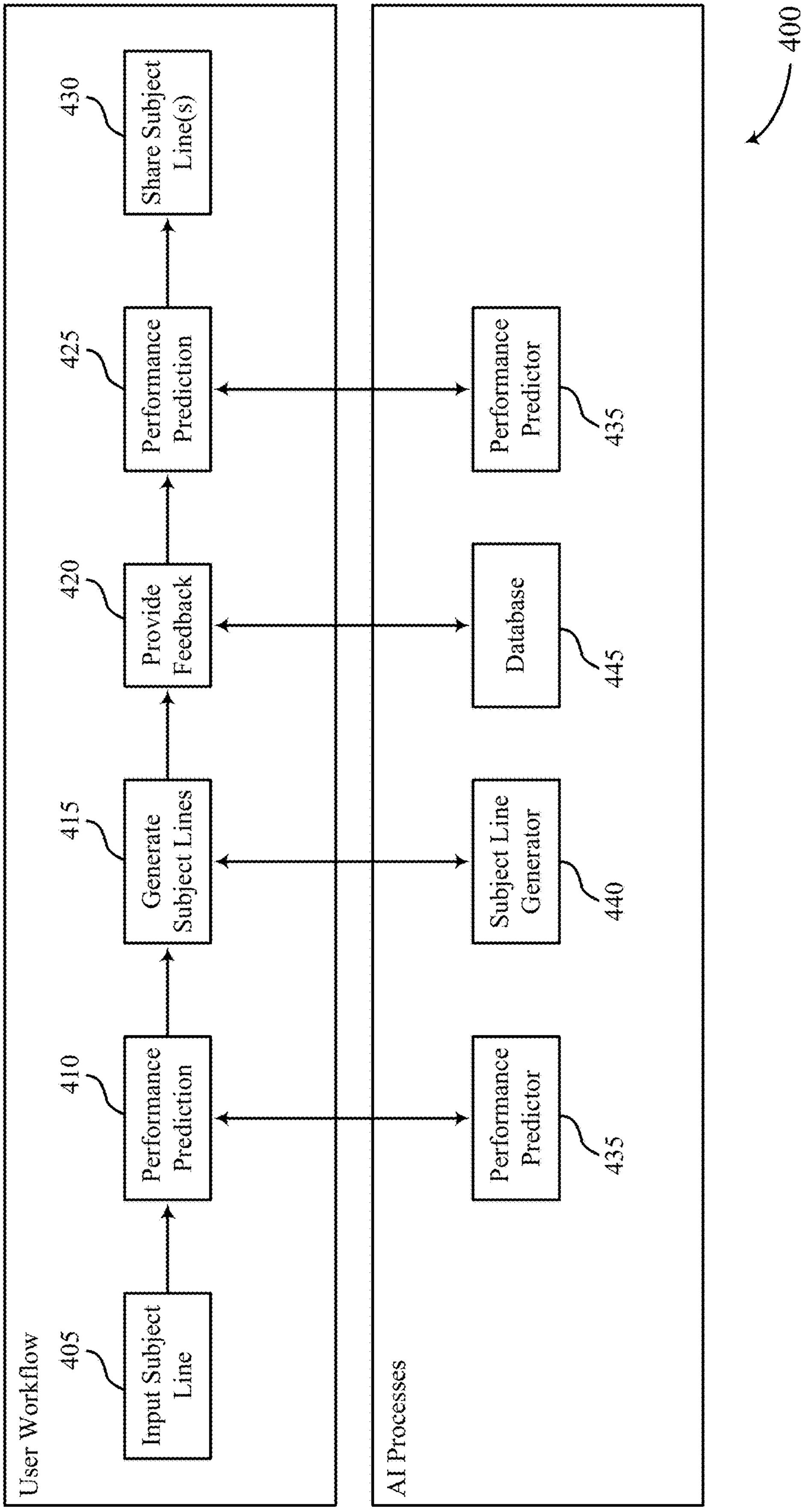

FIG. 4 shows an example of a flow diagram 400 that supports techniques for automatic subject line generation in accordance with aspects of the present disclosure. The flow diagram 400 may implement or be implemented by aspects of the data processing system 100 or the data processing system 200. For example, the flow diagram 400 may be implemented by the content generation service 125-*a*, as described with reference to FIG. 2. The flow diagram 400 includes a user workflow and an AI process flow, which may illustrate interactions between a cloud client (such as the cloud client 105-*a* described with reference to FIG. 2), a content generation service (such as the content generation service 125-*a* described with reference to FIG. 2), and a performance testing service (such as the performance testing service 210 described with reference to FIG. 2).

At 405, a user (such as the cloud client 105-*a* described with reference to FIG. 2) may input a subject line via a user interface (such as the user interface 500 described with reference to FIG. 5) or an API. Accordingly, a subject line performance predictor 435 (such as the performance testing service 210 described with reference to FIG. 2) may generate a performance prediction 410 for the input subject line. Thereafter, a subject line generator 440 (such as the generating component 310 described with reference to FIG. 3) may generate and display a quantity of candidate subject lines at 415.

At 420, the user may rate the candidate subject lines by clicking or otherwise interacting with one or more user interface elements. The feedback (i.e., ratings) provided by the user may be stored in a database 445 for AI quality validation and training. The subject line performance predictor 435 may then provide a performance prediction 425 for the candidate subject lines created by the subject line generator 440. At 430, the user may select or share one or more of the candidate subject lines (e.g., by copying or downloading one or more of the candidate subject lines).

The subject line generator 440 may use machine learning models and neural networking techniques to provide high-quality candidate subject lines that appeal to users. The subject line generator 440 may use three components to ensure high-quality subject line generation and to encourage the machine learning model to maximize input and output. These components may include semantic similarity (computed using BERT score), surface form dissimilarity (based on character-level Levenshtein distance), and length consistency. In some implementations, the subject line generator 440 may use human-annotated A/B testing data to tune the relative weights of these components. The weights may be derived by maximizing Spearman's Rank Correlation between the annotated A/B data and the resulting score (obtained by aggregating the weighted component scores). In some examples, these scores may be combined with soft majority voting to rank the candidate subject lines.

The techniques described herein may support machine learning model distillation. Unlike other sequence-level distillation methods that only generate pseudo-data with a fixed temperature, the machine learning model distillation techniques disclosed herein may span several temperatures so users can easily control temperature during inference to increase the variety of subject lines generated. The subject line generator 440 may use one or more sampling approaches to generate, filter, and/or rank candidate subject lines. These sampling algorithms may include a combination of decoding techniques (such as nucleus sampling) and temperature control techniques. The subject line generator may also vary temperatures when computing SoftMax (e.g., to promote different diversity scale(s) during generation).

The described techniques may also support entity preservation. During training, users may surround named entities (such as company names) with markers based on human-annotated data. During inference, the machine learning model may thus be able to automatically mark entities. After processing is complete, marked entities may be replaced with "placeholder" to promote trust (such that unsolicited company names are excluded from candidate subject lines). Therefore, the machine learning model may function as a multitasking generator that produces appealing subject lines and encourages safety (i.e., brand consistency).

The subject line generation techniques described herein may enable users to generate more compelling subject line variants. Unlike other schemes that use soft or hard tokens for prompt tuning, the machine learning model(s) disclosed herein may use a hybrid model in which soft and hard tokens are interleaved. This setting may preserve the flexibility of soft-prompt tuning, while injecting keywords (i.e., hard tokens) that users would like the machine learning model to give more weight to (such as "polite", "appealing", "marketing", and the like). These keywords may influence the behaviors (i.e., outputs) of the machine learning model.

In some implementations, the subject line generator 440 may employ a toxicity evaluator to ensure that the candidate subject lines returned at 415 include safe results. For example, instead of checking a candidate subject line against a list of inappropriate or toxic words and removing candidate subject lines with words or phrases that could be construed as offensive, the subject line generator 440 may actively create, filter, and rank candidate subject lines on the basis of toxicity (i.e., the cumulative or combined toxicity of words or phrases in a given subject line) to reduce the overall toxicity of candidate subject lines generated by the subject line generator 440.

Figure 5:
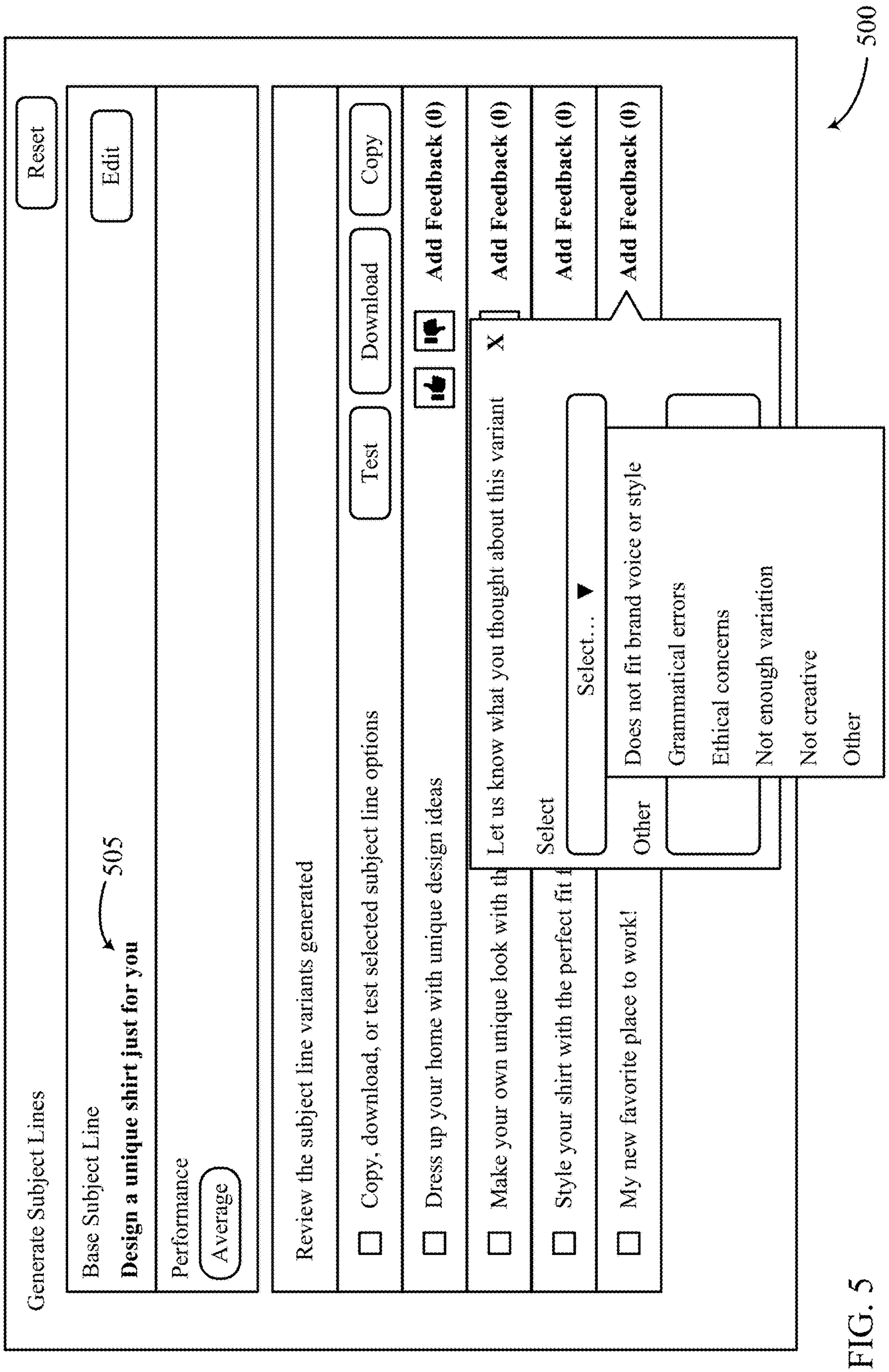
FIGS. 5 and 6 show examples of user interfaces that support techniques for automatic subject line generation in accordance with aspects of the present disclosure.

FIG. 5 shows an example of a user interface 500 that supports techniques for automatic subject line generation in accordance with aspects of the present disclosure. The user interface 500 may implement or be implemented by aspects of any of the data processing systems or flow diagrams described with reference to FIGS. 1 through 4. For example, the user interface 500 may be displayed or otherwise rendered on the screen of a user device, such as the cloud client 105-*a* described with reference to FIG. 2. The user interface 500 includes a number of candidate subject lines, which can be selected by interacting with icons (i.e., check boxes) displayed in association with the candidate subject lines. The user interface 500 also includes an option to provide feedback on the candidate subject lines.

In accordance with aspects of the present disclosure, a content generation service (such as the content generation service 125-*a* described with reference to FIG. 2) supported by a cloud platform may receive an indication of a reference string 505 (such as the reference string 235 described with reference to FIG. 2) from a cloud client. Accordingly, the content generation service may generate multiple candidate strings associated with the reference string 505 based on using a machine learning model (such as the machine learning model 220 described with reference to FIG. 2) to calculate similarity metrics between the reference string 505 and the candidate strings. As described herein, the machine learning model may be trained using a dataset of annotated (i.e., user-curated) strings.

Thereafter, the content generation service may filter and/or rank the candidate strings according to the similarity metrics. The content generation service may cause the quantity of candidate strings (such as the candidate strings 240 described with reference to FIG. 2) to be displayed via the user interface 500. Accordingly, the content generation service may receive feedback associated with the candidate strings, as illustrated in the example of FIG. 5. The content generation service may also receive a request to copy, download, or test one or more of the candidate strings.

Aspects of the user interface 500 may be implemented to realize one or more of the following advantages. The techniques described with reference to FIG. 5 may enable cloud clients to generate, select, and test candidate subject lines with greater efficiency and reduced manual interaction, among other benefits. For example, the content generation service described herein may use various machine learning techniques to generate, filter, and rank candidate subject lines on the basis of semantic similarity and/or predicted customer engagement. As such, the described techniques may improve the process of creating marketing content by providing cloud clients (i.e., marketing users) with engaging and performant content. Moreover, the content generation service described herein may use feedback provided by the cloud clients to update or refine the machine learning algorithms used to generate candidate subject lines, thereby enabling the content generation service to provide more pertinent suggestions in subsequent attempts.

Figure 6:
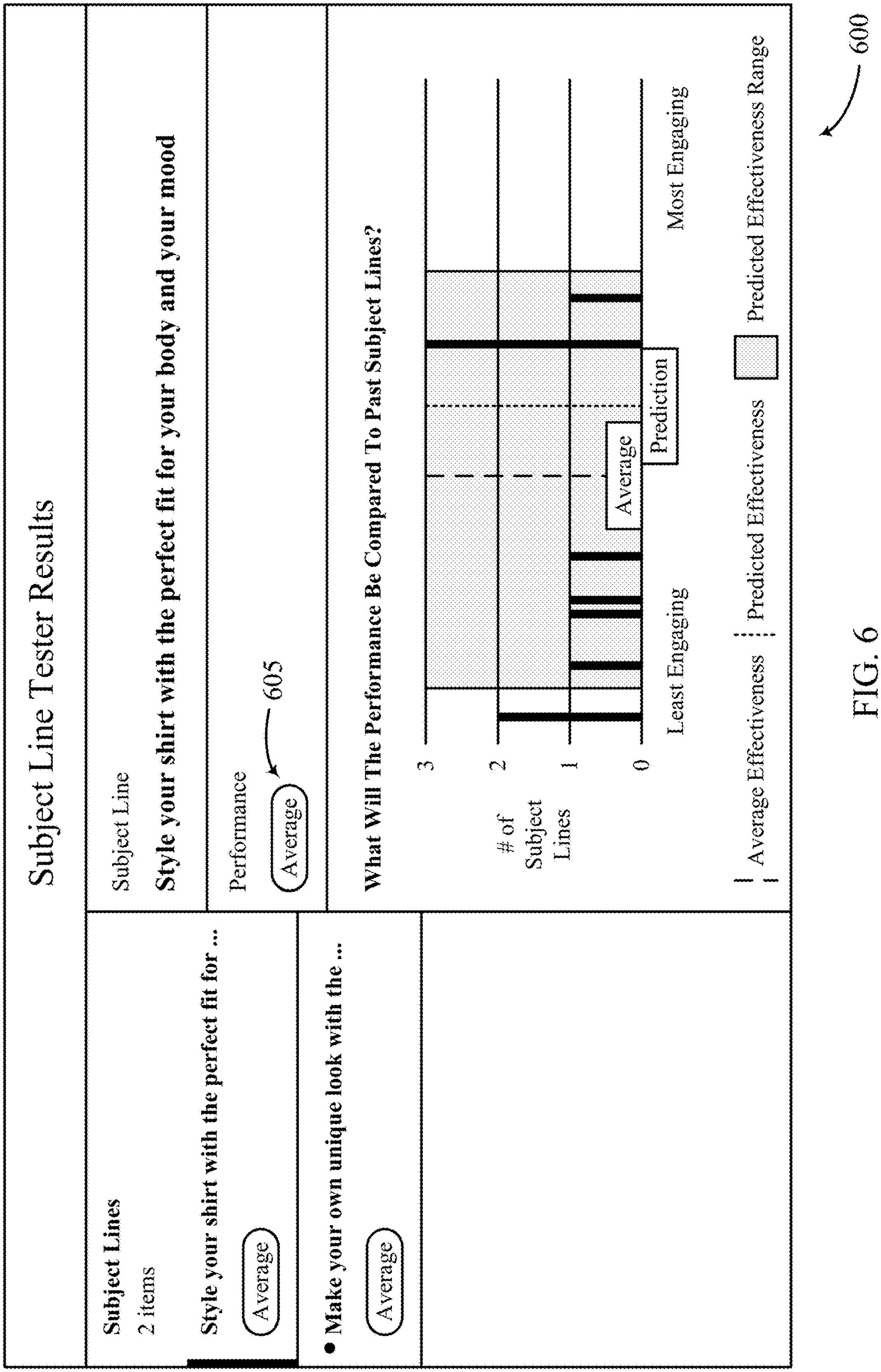

FIG. 6 shows an example of a user interface 600 that supports techniques for automatic subject line generation in accordance with aspects of the present disclosure. The user interface 600 may implement or be implemented by aspects of any of the data processing systems or flow diagrams described with reference to FIGS. 1-4. For example, the user interface 600 may be displayed or otherwise rendered on the screen of a user device, such as the cloud client 105-*a* described with reference to FIG. 2. The user interface 600 may be presented after a user selects one or more candidate subject lines for further testing/processing. The performance prediction 605 shown in the user interface 600 may be determined or otherwise calculated by the performance testing service 210 described with reference to FIG. 2.

As described herein with reference to FIGS. 1 through 5, a content generation service (such as the content generation service 125-*b* described with reference to FIG. 3) supported by a cloud platform may receive an indication of a reference string from a cloud client (such as the cloud client 105-*a* described with reference to FIG. 2). Accordingly, the content generation service may generate multiple candidate strings associated with the reference string by using a machine learning model (such as the machine learning model 220 described with reference to FIG. 2) to calculate similarity metrics between the reference string and the candidate strings. As described herein, the machine learning model may be trained using a dataset of annotated (i.e., user-curated) strings, such as the dataset 230 described with reference to FIG. 2.

Thereafter, the content generation service may filter and/or rank the candidate strings using various metrics, such as semantic similarity (i.e., BERT score), surface form dissimilarity, length consistency, Spearman's Rank Correlation Coefficient, etc. The content generation service may cause the quantity of candidate strings to be displayed via a user interface (such as the user interface 500 described with reference to FIG. 5). Accordingly, the content generation service may receive feedback associated with one or more of the candidate strings. In some examples, the content generation service may also receive a request to copy, download, or test one or more of the candidate strings. If, for example, a user selects a candidate string for additional testing, the content generation service may call (e.g., invoke) a performance testing service to determine predicted engagement rates for the selected candidate strings, as depicted in the example of FIG. 6.

In some implementations, the predicted engagement rate of a candidate subject line may be determined relative to the performance of past subject lines. For example, the predicted performance of a candidate subject line (i.e., "Style your shirt with the perfect fit for your body and your mood") may be classified as Average, Above Average, or Below Average (relative to the performance of past subject lines). The predicted engagement rate for a given subject line may be presented as a chart, graph, or a visualization of the predicted engagement rate. The user interface 600 depicted in the example of FIG. 6 includes a bar graph showing the average effectiveness of previous subject lines, the predicted effectiveness of the candidate subject line, and the predicted effectiveness range of the candidate subject line.

Aspects of the user interface 600 may be implemented to realize one or more of the following advantages. The techniques described with reference to FIG. 6 may enable cloud clients to generate, select, and test candidate subject lines with greater efficiency and reduced manual interaction, among other benefits. For example, the content generation service described herein may use various machine learning and/or neural networking techniques to generate, filter, and rank candidate subject lines on the basis of semantic similarity and/or predicted customer engagement. As such, the described techniques may improve the process of creating marketing content by providing cloud clients (i.e., marketing users) with engaging and performant content. Moreover, the content generation service described herein may use feedback provided by the cloud clients to update or refine the machine learning algorithms used to generate candidate subject lines, thereby enabling the content generation service to provide more pertinent suggestions in subsequent attempts.

Figure 7:
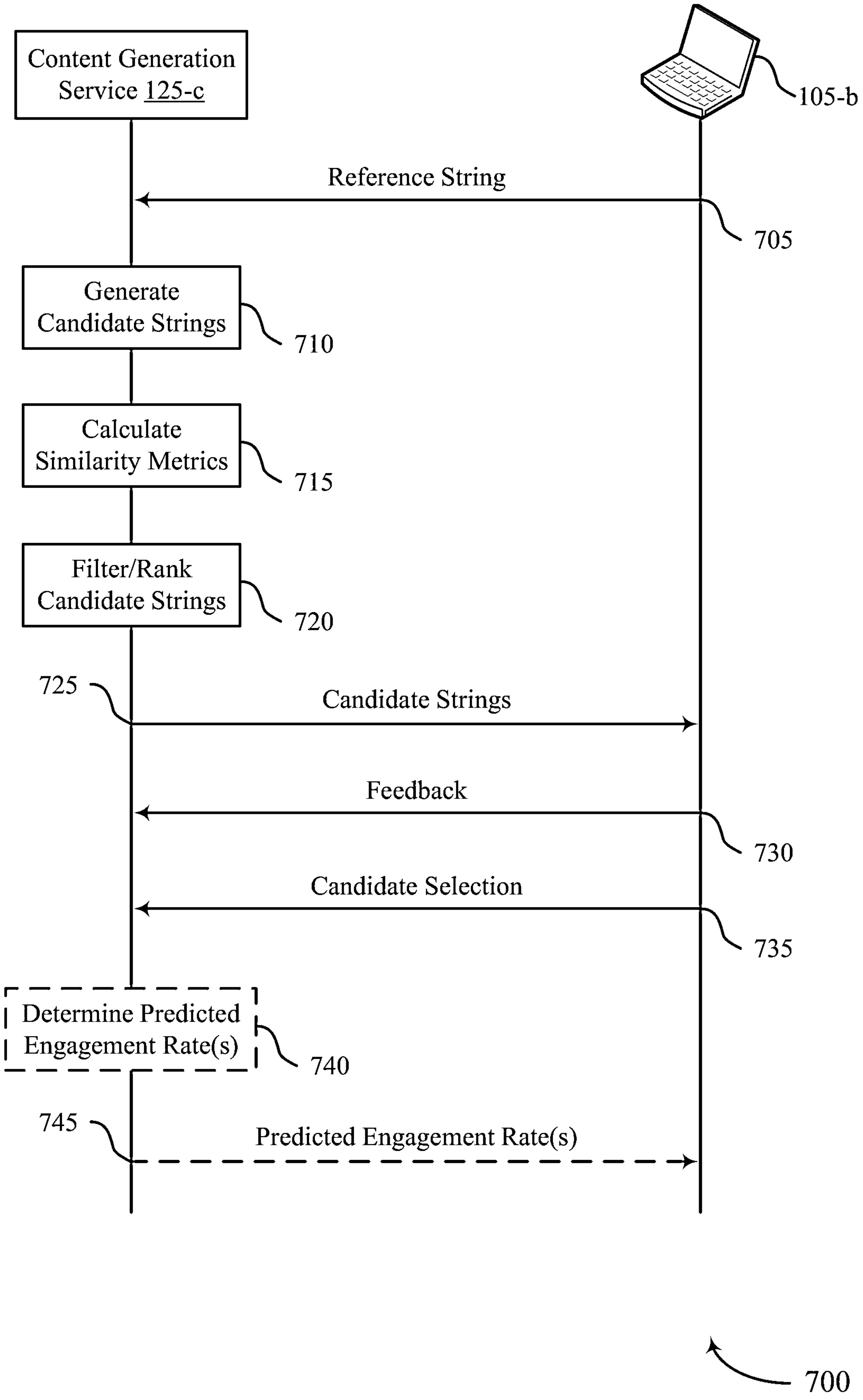
FIG. 7 shows an example of a process flow that supports techniques for automatic subject line generation in accordance with aspects of the present disclosure.

FIG. 7 shows an example of a process flow 700 that supports techniques for automatic subject line generation in accordance with aspects of the present disclosure. The process flow 700 may implement or be implemented by aspects of any of the data processing systems, flow diagrams, or user interfaces described with reference to FIGS. 1 through 6. For example, the process flow 700 includes a content generation service 125-*c*, which may be an example of the content generation service 125-*a* described with reference to FIG. 2. The process flow 700 also includes a cloud client 105-*b*, which may be an example of the cloud client 105-*a* described with reference to FIG. 2. In the following description of the process flow 700, operations between the content generation service 125-*c* and the cloud client 105-*b* may be added, omitted, or performed in a different order (with respect to the exemplary order shown).

At 705, the content generation service 125-*c* may receive an indication of a reference string (i.e., a user input containing an exemplary subject line) from the cloud client 105-*b* via a user interface (such as the user interface 500 described with reference to FIG. 5) or an API. In some examples, the content generation service 125-*c* may parse the reference string to determine whether the reference string includes an entity name (for example, a brand name). If an entity name is detected, the content generation service 125-*c* may retain (i.e., preserve) the entity name. The content generation service 125-*c* may also scan the reference string to determine whether the reference string includes any words or phrases that could be construed as offensive or inappropriate. If any offensive terms are identified, the content generation service 125-*c* may send an alert message to the cloud client 105-*b*.

At 710, the content generation service 125-*c* may generate multiple candidate strings (such as the candidate strings 240 described with reference to FIG. 2) by combining elements (i.e., characters, tokens, words, phrases) from the reference string with elements from annotated strings in a user-curated dataset (such as the dataset 230 described with reference to FIG. 2). In some examples, the content generation service 125-*c* may use a neural network to generate the candidate strings using various decoding techniques (such as nucleus sampling) and/or temperature control algorithms. If the annotated strings contain entity names, the content generation service 125-*c* may replace the entity names with placeholder values or the entity name extracted from the reference string. In some examples, the candidate strings may include hard tokens (i.e., important keywords) interleaved with soft tokens.

At 715, the content generation service 125-*c* may use a machine learning model (such as the machine learning model 220 described with reference to FIG. 2) to calculate similarity metrics between the reference string and the candidate strings. For example, the content generation service 125-*c* may calculate a semantic similarity score (i.e., a BERT score) between the reference string and a reference string by using the machine learning model to perform token-level comparisons between the reference string and the candidate string. The content generation service 125-*c* may also calculate a surface form dissimilarity factor between the reference string and the candidate string by performing character-level comparisons between the reference string and the candidate string.

At 720, the content generation service 125-*c* may filter and/or rank the candidate strings according to the similarity metrics generated at 715. In some examples, the content generation service 125-*c* may filter the candidate strings by assigning weights to each similarity metric based on human-annotated A/B testing data. Additionally, or alternatively, the content generation service 125-*c* may rank the candidate strings according to a soft majority voting scheme (such as a crowd sampling algorithm).

At 725, the content generation service 125-*c* may select and present a quantity of the candidate strings to the cloud client 105-*b* via the user interface. In some examples, the content generation service 125-*c* may display a subset of the candidate strings (such as 5 candidate subject lines) to the cloud client 105-*b*. In other examples, all of the candidate strings may be presented to the cloud client 105-*b*.

At 730, the content generation service 125-*c* may receive feedback from the cloud client 105-*b* via the user interface or the API. The cloud client 105-*b* may provide the feedback by interacting with various icons (such as a thumbs up icon or a thumbs down icon) or selecting options from a drop-down menu (as depicted in the example of FIG. 5).

At 735, the cloud client 105-*b* may select at least one candidate string for further processing and/or testing. The cloud client 105-*b* may also copy or download the at least one candidate string for later use.

At 740, the content generation service 125-*c* may use a performance testing service (such as the performance testing service 210 described with reference to FIG. 2) to determine predicted engagement rate(s) for the at least one candidate string selected by the cloud client 105-*b*.

At 745, the content generation service 125-*c* may surface (i.e., display) the predicted engagement rates(s) to the cloud client 105-*b* via the user interface or API, as depicted in the example of FIG. 6.

Figure 8:
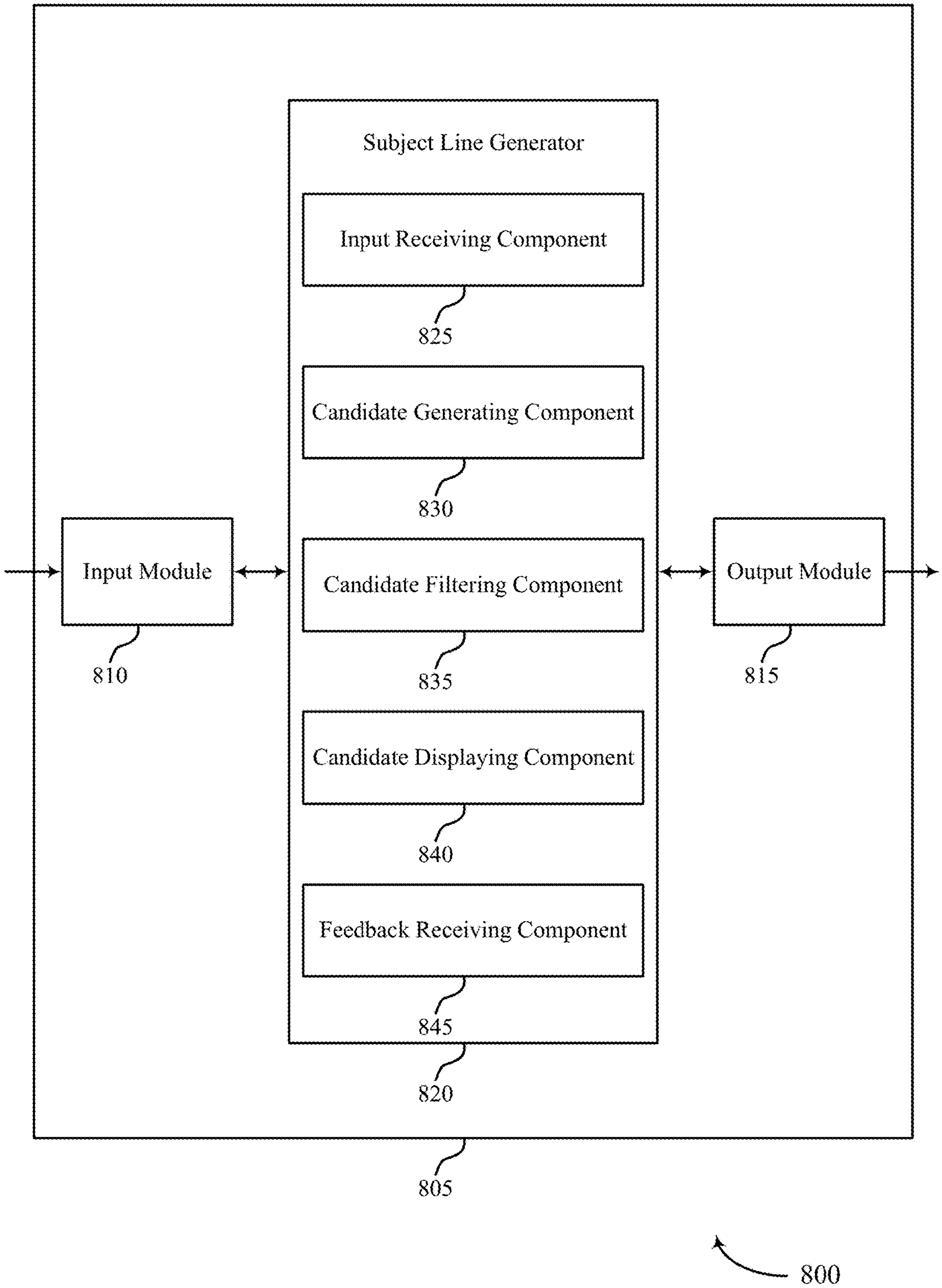
FIG. 8 shows a block diagram of an apparatus that supports techniques for automatic subject line generation in accordance with aspects of the present disclosure.

FIG. 8 shows a block diagram 800 of a device 805 that supports techniques for automatic subject line generation in accordance with aspects of the present disclosure. The device 805 may include an input module 810, an output module 815, and a subject line generator 820. The device 805 may also include at least one processor. Each of these components may be in communication with one another (e.g., via one or more buses).

The input module 810 may manage input signals for the device 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the device 805 for processing. For example, the input module 810 may transmit input signals to the subject line generator 820 to support techniques for automatic subject line generation. In some cases, the input module 810 may be a component of an I/O controller 1010 as described with reference to FIG. 10.

The output module 815 may manage output signals for the device 805. For example, the output module 815 may receive signals from other components of the device 805, such as the subject line generator 820, and may transmit these signals to other components or devices. In some examples, the output module 815 may transmit output signals for display in a user interface, for storage in a database or data store, for further processing at a server or server cluster, or for any other processes at any number of devices or systems. In some cases, the output module 815 may be a component of an I/O controller 1010 as described with reference to FIG. 10.

For example, the subject line generator 820 may include an input receiving component 825, a candidate generating component 830, a candidate filtering component 835, a candidate displaying component 840, a feedback receiving component 845, or any combination thereof. In some examples, the subject line generator 820, or various components thereof, may be configured to perform various operations (e.g., receiving, monitoring, transmitting) using or otherwise in cooperation with the input module 810, the output module 815, or both. For example, the subject line generator 820 may receive information from the input module 810, send information to the output module 815, or be integrated in combination with the input module 810, the output module 815, or both to receive information, transmit information, or perform various other operations as described herein.

The subject line generator 820 may support data processing in accordance with examples disclosed herein. The input receiving component 825 may be configured to support receiving an indication of a reference string from a cloud client of a content generation service via a user interface. The candidate generating component 830 may be configured to support generating, by the content generation service, multiple candidate strings associated with the reference string based on using a machine learning model to calculate similarity metrics between the reference string and the multiple candidate strings, where the machine learning model is trained using a dataset of annotated strings. The candidate filtering component 835 may be configured to support selecting, by the content generation service, a quantity of candidate strings from the multiple candidate strings based on filtering the multiple candidate strings according to the similarity metrics. The candidate displaying component 840 may be configured to support causing the quantity of candidate strings to be displayed in the user interface. The feedback receiving component 845 may be configured to support receiving, from the cloud client via the user interface, feedback associated with the quantity of candidate strings and a selection of at least one candidate string displayed in the user interface.

Figure 9:
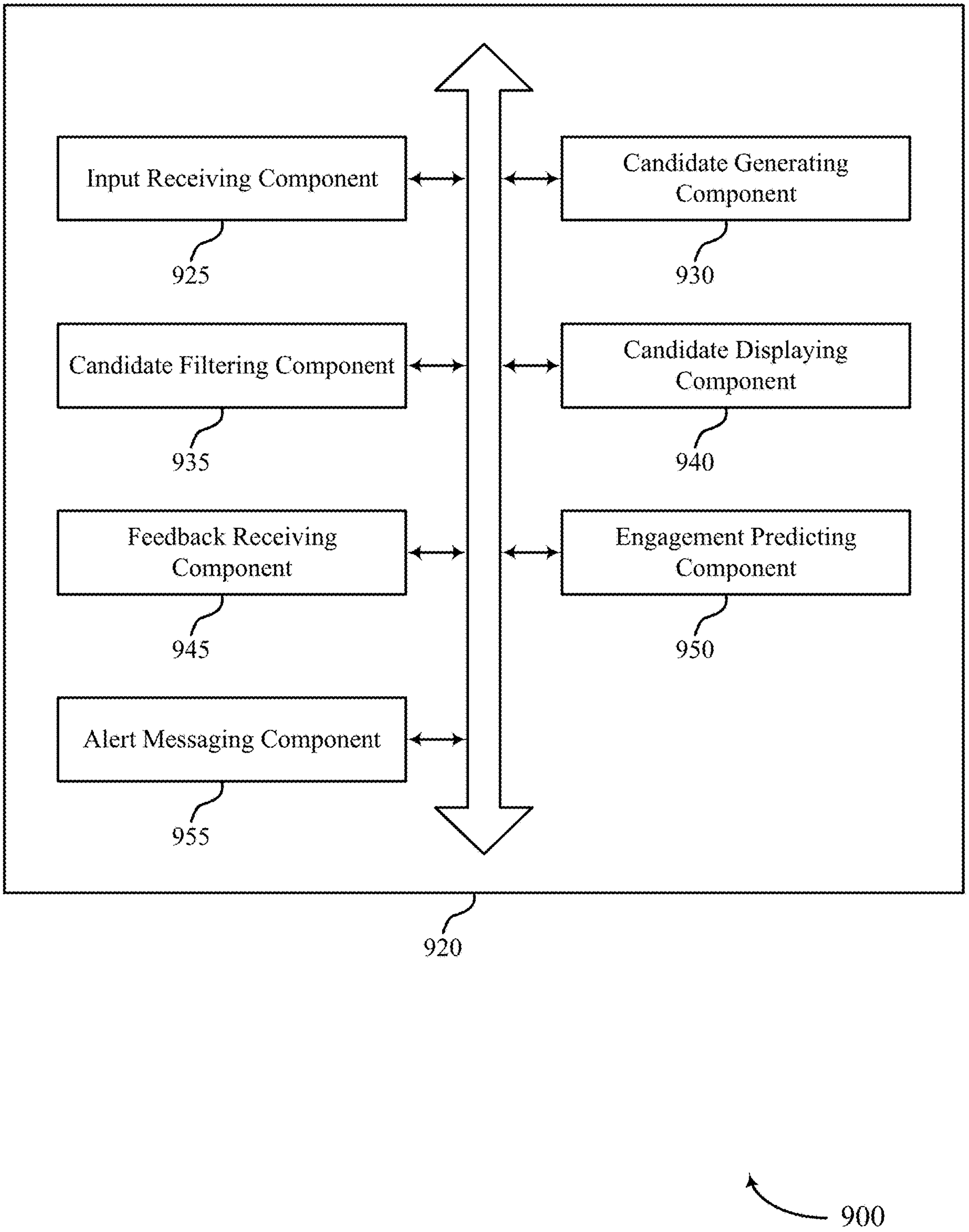
FIG. 9 shows a block diagram of a subject line generator that supports techniques for automatic subject line generation in accordance with aspects of the present disclosure.

FIG. 9 shows a block diagram 900 of a subject line generator 920 that supports techniques for automatic subject line generation in accordance with aspects of the present disclosure. The subject line generator 920 may be an example of aspects of a subject line generator or a subject line generator 820, or both, as described herein. The subject line generator 920, or various components thereof, may be an example of means for performing various aspects of techniques for automatic subject line generation as described herein. For example, the subject line generator 920 may include an input receiving component 925, a candidate generating component 930, a candidate filtering component 935, a candidate displaying component 940, a feedback receiving component 945, an engagement predicting component 950, an alert messaging component 955, or any combination thereof. Each of these components may communicate, directly or indirectly, with one another (e.g., via one or more buses).

The subject line generator 920 may support data processing in accordance with examples disclosed herein. The input receiving component 925 may be configured to support receiving an indication of a reference string from a cloud client of a content generation service via a user interface. The candidate generating component 930 may be configured to support generating, by the content generation service, multiple candidate strings associated with the reference string based on using a machine learning model to calculate similarity metrics between the reference string and the multiple candidate strings, where the machine learning model is trained using a dataset of annotated strings. The candidate filtering component 935 may be configured to support selecting, by the content generation service, a quantity of candidate strings from the multiple candidate strings based on filtering the multiple candidate strings according to the similarity metrics. The candidate displaying component 940 may be configured to support causing the quantity of candidate strings to be displayed in the user interface. The feedback receiving component 945 may be configured to support receiving, from the cloud client via the user interface, feedback associated with the quantity of candidate strings and a selection of at least one candidate string displayed in the user interface.

In some examples, to support calculating similarity metrics between the reference string and the multiple candidate strings, the candidate filtering component 935 may be configured to support calculating a semantic similarity score between the reference string and a candidate string based on using the machine learning model to perform a token-level comparison between the reference string and the candidate string.

In some examples, to support calculating similarity metrics between the reference string and the multiple candidate strings, the candidate filtering component 935 may be configured to support calculating a surface form dissimilarity score between the reference string and a candidate string based on using the machine learning model to perform a character-level comparison between the reference string and the candidate string.

In some examples, to support calculating similarity metrics between the reference string and the multiple candidate strings, the candidate filtering component 935 may be configured to support calculating a length consistency score between the reference string and a candidate string.

In some examples, the candidate filtering component 935 may be configured to support assigning weights to the similarity metrics between the reference string and the multiple candidate strings based on using the machine learning model to calculate a rank correlation between an annotated A/B dataset and the similarity metrics.

In some examples, to support selecting the quantity of candidate strings, the candidate filtering component 935 may be configured to support ranking the multiple candidate strings according to a soft majority voting scheme.

In some examples, to support generating the multiple candidate strings, the candidate generating component 930 may be configured to support determining that an annotated string in the dataset includes an entity name based on a set of markers in the annotated string. In some examples, to support generating the multiple candidate strings, the candidate generating component 930 may be configured to support adding at least a portion of the annotated string to a candidate string. In some examples, to support generating the multiple candidate strings, the candidate generating component 930 may be configured to support replacing the entity name in the candidate string with a placeholder value.

In some examples, the multiple candidate strings include hard tokens interleaved with soft tokens. In some examples, the candidate generating component 930 may be configured to support sampling the reference string and the multiple candidate strings using a decoding algorithm and a temperature control algorithm.

In some examples, the engagement predicting component 950 may be configured to support determining respective predicted engagement rates for the quantity of candidate strings based on using a performance testing service to evaluate the quantity of candidate strings with respect to historic performance data.

In some examples, to support causing the multiple candidate strings to be displayed, the engagement predicting component 950 may be configured to support causing the respective predicted engagement rates to be displayed in association with the quantity of candidate strings in the user interface.

In some examples, the alert messaging component 955 may be configured to support causing display of an alert message in the user interface based on determining that one or more words in the reference string are offensive or inappropriate, where the alert message includes a first option to disregard the alert message and a second option to modify the reference string.

In some examples, to support receiving the feedback, the feedback receiving component 945 may be configured to support causing display of a feedback menu in the user interface based on a mouse click event associated with an interactive element of the user interface. In some examples, to support receiving the feedback, the feedback receiving component 945 may be configured to support receiving, from the cloud client via the user interface, a selection of one or more options from the feedback menu. In some examples, the dataset of annotated strings excludes customer data.

In some examples, to support selecting the quantity of candidate strings, the candidate filtering component 935 may be configured to support selecting all of the candidate strings for display in the user interface based on the similarity metrics between the reference string and the multiple candidate strings.

Figure 10:
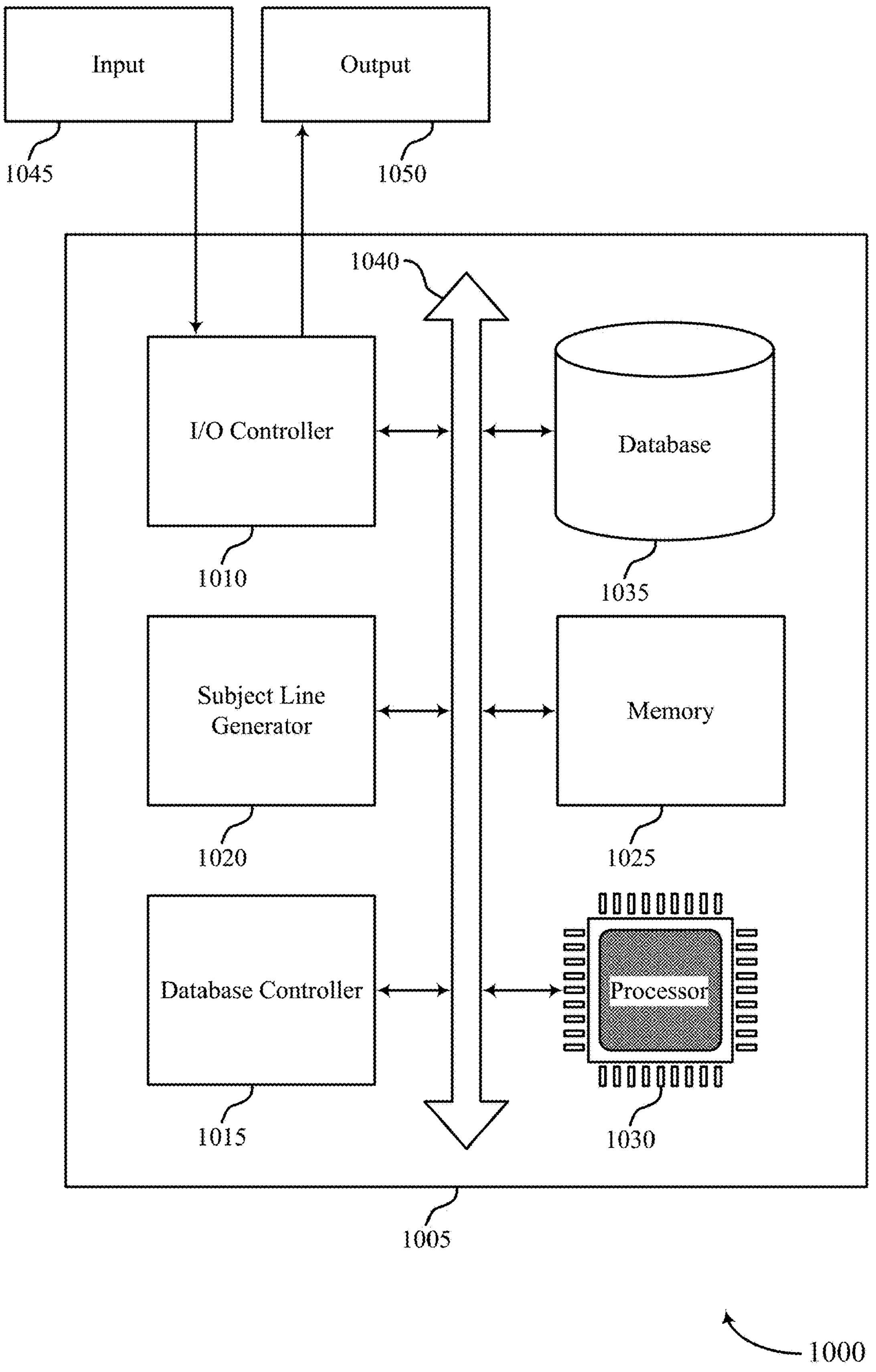
FIG. 10 shows a diagram of a system including a device that supports techniques for automatic subject line generation in accordance with aspects of the present disclosure.

FIG. 10 shows a diagram of a system 1000 including a device 1005 that supports techniques for automatic subject line generation in accordance with aspects of the present disclosure. The device 1005 may be an example of or include the components of a device 805 as described herein. The device 1005 may include components for bi-directional data communications including components for transmitting and receiving communications, such as a subject line generator 1020, an input/output (I/O) controller 1010, a database controller 1015, at least one memory 1025, at least one processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of at least one processor 1030. In some examples, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

The at least one memory 1025 may include random-access memory (RAM) and read-only memory (ROM). The at least one memory 1025 may store computer-readable, computer-executable software including instructions that, when executed, cause the at least one processor 1030 to perform various functions described herein. In some cases, the at least one memory 1025 may contain, among other things, a basic I/O system (BIOS) which may control basic hardware or software operation such as the interaction with peripheral components or devices.

The at least one processor 1030 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the at least one processor 1030 may be configured to operate a memory array using a memory controller. In other cases, a memory controller may be integrated into the at least one processor 1030. The at least one processor 1030 may be configured to execute computer-readable instructions stored in at least one memory 1025 to perform various functions (e.g., functions or tasks supporting techniques for automatic subject line generation).

The subject line generator 1020 may support data processing in accordance with examples disclosed herein. For example, the subject line generator 1020 may be configured to support receiving an indication of a reference string from a cloud client of a content generation service via a user interface. The subject line generator 1020 may be configured to support generating, by the content generation service, multiple candidate strings associated with the reference string based on using a machine learning model to calculate similarity metrics between the reference string and the multiple candidate strings, where the machine learning model is trained using a dataset of annotated strings. The subject line generator 1020 may be configured to support selecting, by the content generation service, a quantity of candidate strings from the multiple candidate strings based on filtering the multiple candidate strings according to the similarity metrics. The subject line generator 1020 may be configured to support causing the quantity of candidate strings to be displayed in the user interface. The subject line generator 1020 may be configured to support receiving, from the cloud client via the user interface, feedback associated with the quantity of candidate strings and a selection of at least one candidate string displayed in the user interface.

By including or configuring the subject line generator 1020 in accordance with examples as described herein, the device 1005 may support techniques for generating and testing candidate subject lines with greater efficiency and reduced manual interaction, among other benefits. For example, the device 1005 may use various machine learning techniques to generate, filter, and rank candidate subject lines on the basis of semantic similarity and/or predicted performance. As such, the described techniques may improve the process of creating marketing content by providing cloud clients (i.e., marketing users) with engaging and performant content. Moreover, the device 1005 may use feedback provided by the cloud clients to update or refine the machine learning algorithms used to generate candidate subject lines, thereby enabling the device 1005 to provide more pertinent suggestions in subsequent iterations.

Figure 11:
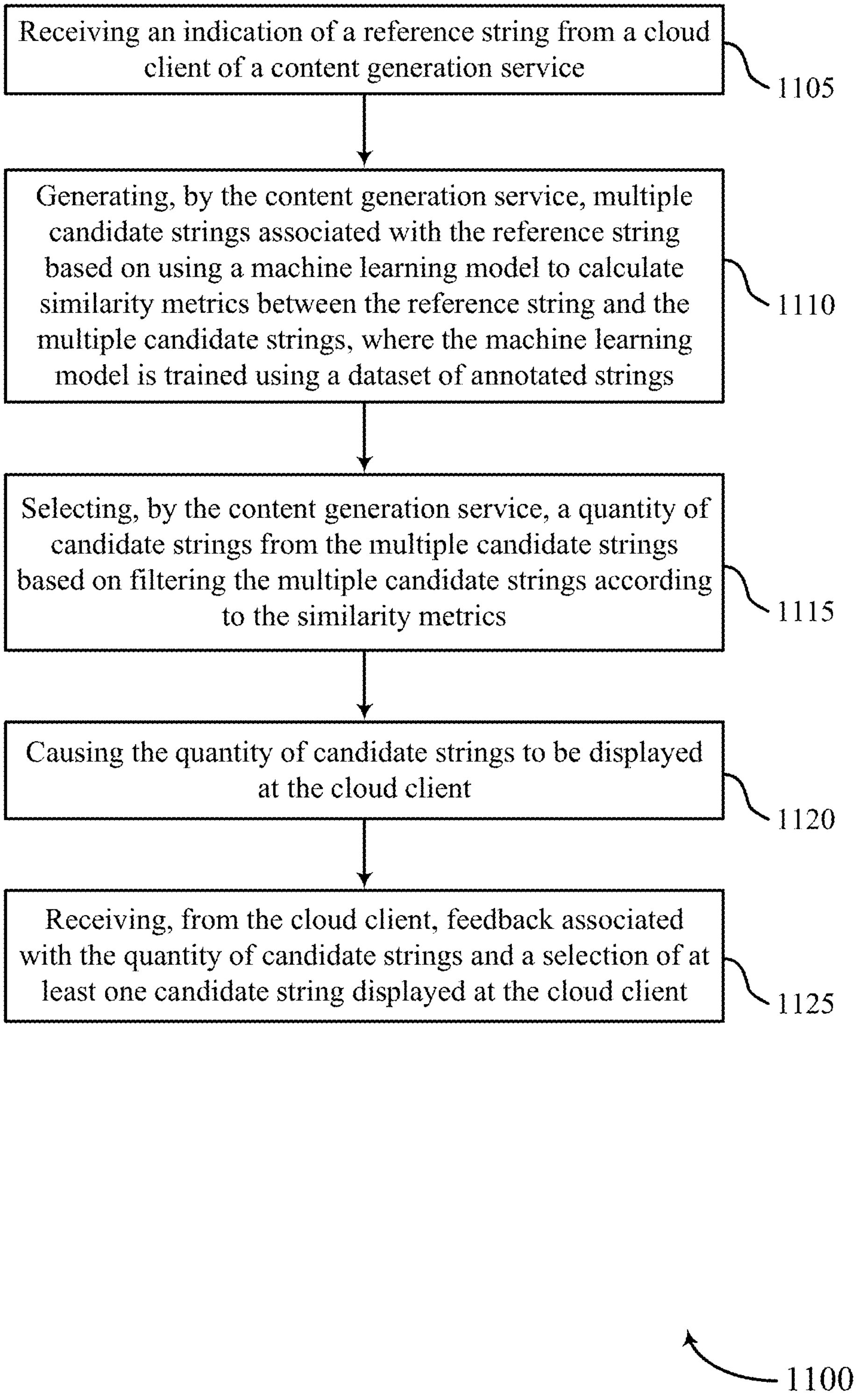
FIGS. 11 and 12 show flowcharts illustrating methods that support techniques for automatic subject line generation in accordance with aspects of the present disclosure.

FIG. 11 shows a flowchart illustrating a method 1100 that supports techniques for automatic subject line generation in accordance with aspects of the present disclosure. The operations of the method 1100 may be implemented by a content generation service or components thereof. For example, the operations of the method 1100 may be performed by a content generation service 125, as described with reference to FIGS. 1 through 10. In some examples, the content generation service may execute a set of instructions to control the functional elements of the content generation service to perform the described functions. Additionally, or alternatively, the content generation service may perform aspects of the described functions using special-purpose hardware.

At 1105, the method may include receiving an indication of a reference string from a cloud client of a content generation service. The operations of 1105 may be performed in accordance with examples disclosed herein. In some examples, aspects of the operations of 1105 may be performed by an input receiving component 925, as described with reference to FIG. 9.

At 1110, the method may include generating, by the content generation service, multiple candidate strings associated with the reference string based on using a machine learning model to calculate similarity metrics between the reference string and the multiple candidate strings, where the machine learning model is trained using a dataset of annotated strings. The operations of 1110 may be performed in accordance with examples disclosed herein. In some examples, aspects of the operations of 1110 may be performed by a candidate generating component 930, as described with reference to FIG. 9.

At 1115, the method may include selecting, by the content generation service, a quantity of candidate strings from the multiple candidate strings based on filtering the multiple candidate strings according to the similarity metrics. The operations of 1115 may be performed in accordance with examples disclosed herein. In some examples, aspects of the operations of 1115 may be performed by a candidate filtering component 935, as described with reference to FIG. 9.

At 1120, the method may include causing the quantity of candidate strings to be displayed at the cloud client. The operations of 1120 may be performed in accordance with examples disclosed herein. In some examples, aspects of the operations of 1120 may be performed by a candidate displaying component 940, as described with reference to FIG. 9.

At 1125, the method may include receiving, from the cloud client, feedback associated with the quantity of candidate strings and a selection of at least one candidate string displayed at the cloud client. The operations of 1125 may be performed in accordance with examples disclosed herein. In some examples, aspects of the operations of 1125 may be performed by a feedback receiving component 945, as described with reference to FIG. 9.

Figure 12:
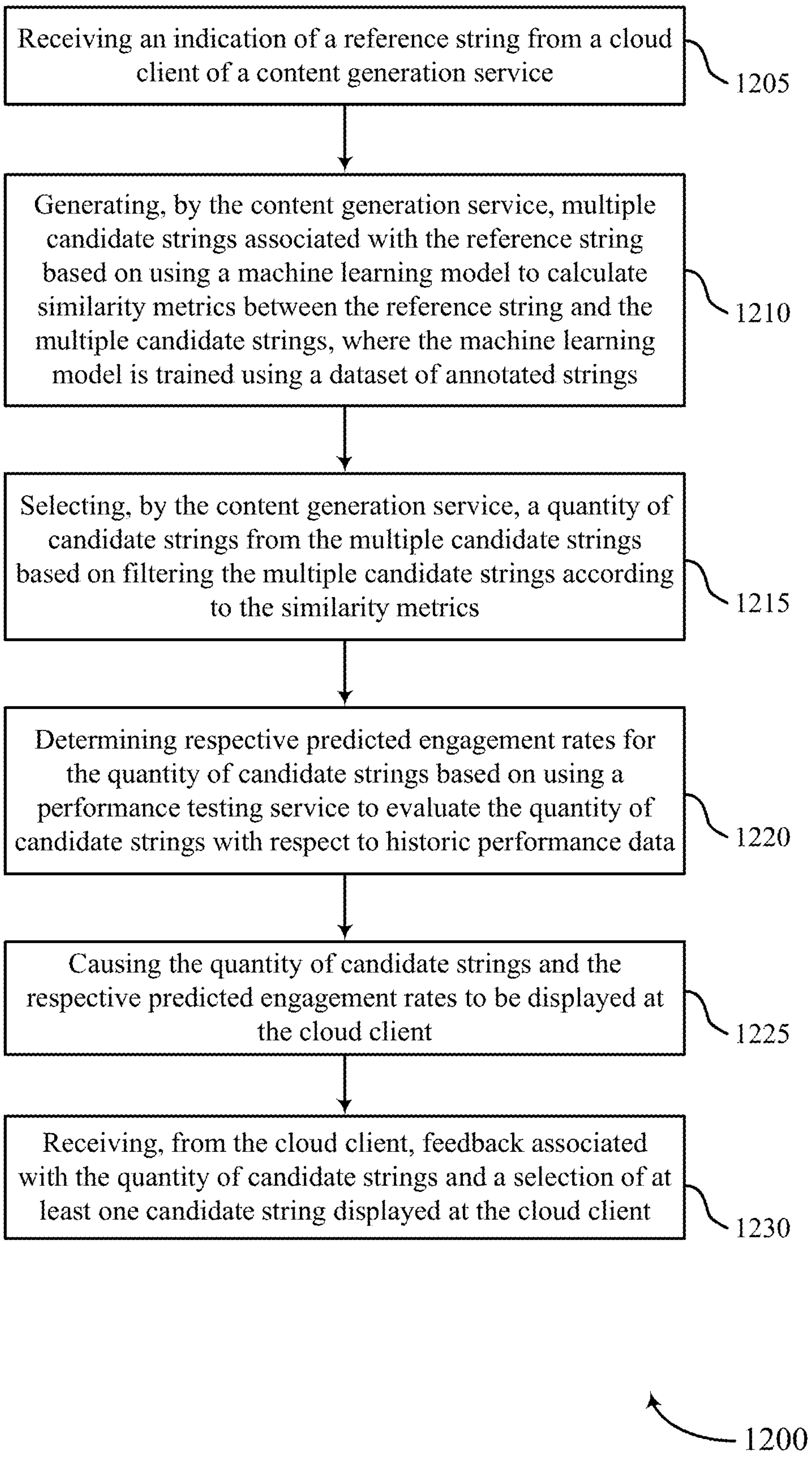

FIG. 12 shows a flowchart illustrating a method 1200 that supports techniques for automatic subject line generation in accordance with aspects of the present disclosure. The operations of the method 1200 may be implemented by a content generation service or components thereof. For example, the operations of the method 1200 may be performed by a content generation service 125, as described with reference to FIGS. 1 through 10. In some examples, the content generation service may execute a set of instructions to control the functional elements of the content generation service to perform the described functions. Additionally, or alternatively, the content generation service may perform aspects of the described functions using special-purpose hardware.

At 1205, the method may include receiving an indication of a reference string from a cloud client of a content generation service. The operations of 1205 may be performed in accordance with examples disclosed herein. In some examples, aspects of the operations of 1205 may be performed by an input receiving component 925, as described with reference to FIG. 9.

At 1210, the method may include generating, by the content generation service, multiple candidate strings associated with the reference string based on using a machine learning model to calculate similarity metrics between the reference string and the multiple candidate strings, where the machine learning model is trained using a dataset of annotated strings. The operations of 1210 may be performed in accordance with examples disclosed herein. In some examples, aspects of the operations of 1210 may be performed by a candidate generating component 930, as described with reference to FIG. 9.

At 1215, the method may include selecting, by the content generation service, a quantity of candidate strings from the multiple candidate strings based on filtering the multiple candidate strings according to the similarity metrics. The operations of 1215 may be performed in accordance with examples disclosed herein. In some examples, aspects of the operations of 1215 may be performed by a candidate filtering component 935, as described with reference to FIG. 9.

At 1220, the method may include determining respective predicted engagement rates for the quantity of candidate strings based on using a performance testing service to evaluate the quantity of candidate strings with respect to historic performance data. The operations of 1220 may be performed in accordance with examples disclosed herein. In some examples, aspects of the operations of 1220 may be performed by an engagement predicting component 950, as described with reference to FIG. 9.

At 1225, the method may include causing the quantity of candidate strings to be displayed at the cloud client. The operations of 1225 may be performed in accordance with examples disclosed herein. In some examples, aspects of the operations of 1225 may be performed by a candidate displaying component 940, as described with reference to FIG. 9.

At 1230, the method may include receiving, from the cloud client, feedback associated with the quantity of candidate strings and a selection of at least one candidate string displayed at the cloud client. The operations of 1230 may be performed in accordance with examples disclosed herein. In some examples, aspects of the operations of 1230 may be performed by a feedback receiving component 945, as described with reference to FIG. 9.

A method for data processing is described. The method may include: receiving an indication of a reference string from a cloud client of a content generation service; generating, by the content generation service, multiple candidate strings associated with the reference string based on using a machine learning model to calculate similarity metrics between the reference string and the multiple candidate strings, where the machine learning model is trained using a dataset of annotated strings; selecting, by the content generation service, a quantity of candidate strings from the multiple candidate strings based on filtering the multiple candidate strings according to the similarity metrics; causing the quantity of candidate strings to be displayed at the cloud client; and receiving, from the cloud client, feedback associated with the quantity of candidate strings and a selection of at least one candidate string displayed at the cloud client.

An apparatus for data processing is described. The apparatus may include at least one processor, at least one memory coupled with the at least one processor, and instructions stored in the at least one memory. The instructions may be executable by the at least one processor to cause the apparatus to: receive an indication of a reference string from a cloud client of a content generation service at the cloud client; generate, by the content generation service, multiple candidate strings associated with the reference string based on using a machine learning model to calculate similarity metrics between the reference string and the multiple candidate strings, where the machine learning model is trained using a dataset of annotated strings; select, by the content generation service, a quantity of candidate strings from the multiple candidate strings based on filtering the multiple candidate strings according to the similarity metrics; cause the quantity of candidate strings to be displayed at the cloud client; and receive, from the cloud client, feedback associated with the quantity of candidate strings and a selection of at least one candidate string displayed at the cloud client.

Another apparatus for data processing is described. The apparatus may include: means for receiving an indication of a reference string from a cloud client of a content generation service; means for generating, by the content generation service, multiple candidate strings associated with the reference string based on using a machine learning model to calculate similarity metrics between the reference string and the multiple candidate strings, where the machine learning model is trained using a dataset of annotated strings; means for selecting, by the content generation service, a quantity of candidate strings from the multiple candidate strings based on filtering the multiple candidate strings according to the similarity metrics; means for causing the quantity of candidate strings to be displayed; and means for receiving, from the cloud client, feedback associated with the quantity of candidate strings and a selection of at least one candidate string displayed at the cloud client.

A non-transitory computer-readable medium storing code for data processing is described. The code may include instructions executable by at least one processor to: receive an indication of a reference string from a cloud client of a content generation service; generate, by the content generation service, multiple candidate strings associated with the reference string based on using a machine learning model to calculate similarity metrics between the reference string and the multiple candidate strings, where the machine learning model is trained using a dataset of annotated strings; select, by the content generation service, a quantity of candidate strings from the multiple candidate strings based on filtering the multiple candidate strings according to the similarity metrics; cause the quantity of candidate strings to be displayed at the cloud client; and receive, from the cloud client, feedback associated with the quantity of candidate strings and a selection of at least one candidate string displayed at the cloud client.

In some examples of the methods, apparatuses, and non-transitory computer-readable media described herein, calculating similarity metrics between the reference string and the multiple candidate strings may include operations, features, means, or instructions for calculating a semantic similarity score between the reference string and a candidate string based on using the machine learning model to perform a token-level comparison between the reference string and the candidate string.

In some examples of the methods, apparatuses, and non-transitory computer-readable media described herein, calculating similarity metrics between the reference string and the multiple candidate strings may include operations, features, means, or instructions for calculating a surface form dissimilarity score between the reference string and a candidate string based on using the machine learning model to perform a character-level comparison between the reference string and the candidate string.

In some examples of the methods, apparatuses, and non-transitory computer-readable media described herein, calculating similarity metrics between the reference string and the multiple candidate strings may include operations, features, means, or instructions for calculating a length consistency score between the reference string and a candidate string.

Some examples of the methods, apparatuses, and non-transitory computer-readable media described herein may further include operations, features, means, or instructions for assigning weights to the similarity metrics between the reference string and the multiple candidate strings based on using the machine learning model to calculate a rank correlation between an annotated A/B dataset and the similarity metrics.

In some examples of the methods, apparatuses, and non-transitory computer-readable media described herein, selecting the quantity of candidate strings may include operations, features, means, or instructions for ranking the multiple candidate strings according to a soft majority voting scheme.

In some examples of the methods, apparatuses, and non-transitory computer-readable media described herein, generating the multiple candidate strings may include operations, features, means, or instructions for determining that an annotated string in the dataset includes an entity name based on a set of markers in the annotated string, adding at least a portion of the annotated string to a candidate string, and replacing the entity name in the candidate string with a placeholder value.

In some examples of the methods, apparatuses, and non-transitory computer-readable media described herein, the multiple candidate strings include hard tokens interleaved with soft tokens.

Some examples of the methods, apparatuses, and non-transitory computer-readable media described herein may further include operations, features, means, or instructions for sampling the reference string and the multiple candidate strings using a decoding algorithm and a temperature control algorithm.

Some examples of the methods, apparatuses, and non-transitory computer-readable media described herein may further include operations, features, means, or instructions for determining respective predicted engagement rates for the quantity of candidate strings based on using a performance testing service to evaluate the quantity of candidate strings with respect to historic performance data.

In some examples of the methods, apparatuses, and non-transitory computer-readable media described herein, causing the multiple candidate strings to be displayed may include operations, features, means, or instructions for causing the respective predicted engagement rates to be displayed in association with the quantity of candidate strings.

Some examples of the methods, apparatuses, and non-transitory computer-readable media described herein may further include operations, features, means, or instructions for causing display of an alert message based on determining that one or more words in the reference string may be offensive or inappropriate, where the alert message includes a first option to disregard the alert message and a second option to modify the reference string.

In some examples of the methods, apparatuses, and non-transitory computer-readable media described herein, receiving the feedback may include operations, features, means, or instructions for causing display of a feedback menu based on a mouse click event associated with an interactive user interface element and receiving, from the cloud client, a selection of one or more options from the feedback menu.

In some examples of the methods, apparatuses, and non-transitory computer-readable media described herein, the dataset of annotated strings excludes customer data.

In some examples of the methods, apparatuses, and non-transitory computer-readable media described herein, selecting the quantity of candidate strings may include operations, features, means, or instructions for selecting all of the candidate strings for display based on the similarity metrics between the reference string and the multiple candidate strings.

In some examples of the methods, apparatuses, and non-transitory computer-readable media described herein, the feedback is received from the cloud client via a user interface or an API.

The following provides an overview of aspects of the present disclosure:

Aspect 1: A method for data processing, including: receiving an indication of a reference string from a cloud client of a content generation service; generating, by the content generation service, a set of candidate strings associated with the reference string based on using a machine learning model to calculate similarity metrics between the reference string and the set of candidate strings, where the machine learning model is trained using a dataset of annotated strings; selecting, by the content generation service, a quantity of candidate strings from the set of candidate strings based on filtering the set of candidate strings according to the similarity metrics; causing the quantity of candidate strings to be displayed at the cloud client; and receiving, from the cloud client, feedback associated with the quantity of candidate strings and a selection of at least one candidate string displayed at the cloud client.

Aspect 2: The method of aspect 1, where calculating similarity metrics between the reference string and the set of candidate strings includes: calculating a semantic similarity score between the reference string and a candidate string based on using the machine learning model to perform a token-level comparison between the reference string and the candidate string.

Aspect 3: The method of any of aspects 1 through 2, where calculating similarity metrics between the reference string and the set of candidate strings includes: calculating a surface form dissimilarity score between the reference string and a candidate string based on using the machine learning model to perform a character-level comparison between the reference string and the candidate string.

Aspect 4: The method of any of aspects 1 through 3, where calculating similarity metrics between the reference string and the set of candidate strings includes: calculating a length consistency score between the reference string and a candidate string.

Aspect 5: The method of any of aspects 1 through 4, further including: assigning weights to the similarity metrics between the reference string and the set of candidate strings based on using the machine learning model to calculate a rank correlation between an annotated A/B dataset and the similarity metrics.

Aspect 6: The method of any of aspects 1 through 5, where selecting the quantity of candidate strings includes: ranking the set of candidate strings according to a soft majority voting scheme.

Aspect 7: The method of any of aspects 1 through 6, where generating the set of candidate strings includes: determining that an annotated string in the dataset includes an entity name based on a set of markers in the annotated string; adding at least a portion of the annotated string to a candidate string; and replacing the entity name in the candidate string with a placeholder value.

Aspect 8: The method of aspect 7, where the set of candidate strings include hard tokens interleaved with soft tokens.

Aspect 9: The method of any of aspects 1 through 8, further including: sampling the reference string and the set of candidate strings using a decoding algorithm and a temperature control algorithm.

Aspect 10: The method of any of aspects 1 through 9, further including: determining respective predicted engagement rates for the quantity of candidate strings based on using a performance testing service to evaluate the quantity of candidate strings with respect to historic performance data.

Aspect 11: The method of aspect 10, where causing the set of candidate strings to be displayed includes: causing the respective predicted engagement rates to be displayed in association with the quantity of candidate strings.

Aspect 12: The method of any of aspects 1 through 11, further including: causing display of an alert message at the cloud client based on determining that one or more words in the reference string are offensive or inappropriate, where the alert message includes a first option to disregard the alert message and a second option to modify the reference string.

Aspect 13: The method of any of aspects 1 through 12, where receiving the feedback includes: causing display of a feedback menu based on a mouse click event associated with an interactive user interface element; and receiving, from the cloud client, a selection of one or more options from the feedback menu.

Aspect 14: The method of any of aspects 1 through 13, where the dataset of annotated strings excludes customer data.

Aspect 15: The method of any of aspects 1 through 14, where selecting the quantity of candidate strings includes: selecting all of the candidate strings for display based on the similarity metrics between the reference string and the set of candidate strings.

Aspect 16: The method of any of aspects 1 through 15, where the feedback is received from the cloud client via a user interface or an API.

Aspect 17: An apparatus for data processing, including: at least one processor; at least one memory coupled with the at least one processor; and instructions stored in the at least one memory, where the instructions are executable by the at least one processor to cause the apparatus to perform a method of any of aspects 1 through 16.

Aspect 18: An apparatus for data processing, including: at least one means for performing a method of any of aspects 1 through 16.

Aspect 19: A non-transitory computer-readable medium storing code for data processing, the code including instructions that are executable by at least one processor to perform a method of any of aspects 1 through 16.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the at least one processor may be any conventional processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration).

Any functions or operations described herein as being capable of being performed by at least one processor may be performed by multiple processors that, individually or collectively, are capable of performing the described functions or operations. For example, the functions described herein may be performed by multiple processors, each tasked with at least a subset of the described functions, such that, collectively, the multiple processors perform all of the described functions. As such, the described functions can be performed by a single processor or a group of processors functioning together (i.e., collectively) to perform the described functions, where any one processor performs at least a subset of the described functions.

Likewise, any functions or operations described herein as being capable of being performed by at least one memory may be performed by multiple memories that, individually or collectively, are capable of performing the described functions or operations. For example, the functions described herein may be performed by multiple memories, each tasked with at least a subset of the described functions, such that, collectively, the multiple memories perform all of the described functions. As such, the described functions can be performed by a single memory or a group of memories functioning together (i.e., collectively) to perform the described functions, where any one memory performs at least a subset of the described functions.

The functions described herein may be implemented in hardware, software executed by at least one processor, firmware, or any combination thereof. If implemented in software executed by at least one processor, the functions may be stored on or transmitted over as one or more instructions or code on a computer-readable medium. Other examples and implementations are within the scope of the disclosure and appended claims. For example, due to the nature of software, functions described above can be implemented using software executed by at least one processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Also, as used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components." and referring to "the component" subsequently in the claims shall be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving a single exemplary subject line from a cloud client of a content generation service, wherein the single exemplary subject line is a reference subject line for generation of candidate subject lines and comprises a first entity name;

generating a prompt for a hybrid machine learning model by interleaving soft tokens and hard tokens into an interleaved prompt;

generating, by inputting the interleaved prompt into the hybrid machine learning model of the content generation service and in response to receiving the single exemplary subject line from the cloud client, a plurality of candidate subject lines similar to the single exemplary subject line, wherein the hybrid machine learning model is trained using a dataset of annotated subject lines, and wherein generating the plurality of candidate subject lines comprises:

determining that an annotated subject line in the dataset includes a second entity name based at least in part on a set of markers in the annotated subject line that surround the second entity name;

adding at least a portion of the annotated subject line comprising the second entity name to a candidate subject line of the plurality of candidate subject lines; and replacing the second entity name in the candidate subject line with the first entity name extracted from the single exemplary subject line;

deriving respective weights for a first semantic similarity score, a first surface form dissimilarity score, and a first length consistency score that correspond to an annotated A/B dataset, wherein the respective weights relatively maximize a rank correlation between the annotated A/B dataset and an aggregation of the first semantic similarity score, the first surface form dissimilarity score, and the first length consistency score according to the respective weights;

calculating a respective semantic similarity score, a respective surface form dissimilarity score, and a respective length consistency score between the single exemplary subject line and each candidate subject line of the plurality of candidate subject lines;

selecting, by the content generation service, a quantity of candidate subject lines from the plurality of candidate subject lines based at least in part on filtering the plurality of candidate subject lines according to an aggregation of the respective semantic similarity score, the respective surface form dissimilarity score, and the respective length consistency score that are associated with each candidate subject line and are weighted by the respective weights;

causing the quantity of candidate subject lines to be displayed at the cloud client; and receiving, from the cloud client, feedback associated with the quantity of candidate subject lines and a selection of at least one candidate subject line displayed at the cloud client.

2. The method of claim 1, wherein calculating the respective semantic similarity score comprises:

using the hybrid machine learning model to perform a token-level comparison between the single exemplary subject line and each candidate subject line of the plurality of candidate subject lines.

3. The method of claim 1, wherein calculating the respective surface form dissimilarity score comprises:

using the hybrid machine learning model to perform a character-level comparison between the single exemplary subject line and each candidate subject line of the plurality of candidate subject lines.

4. The method of claim 1, wherein deriving the respective weights comprises:

using the hybrid machine learning model to calculate the rank correlation between the annotated A/B dataset and the aggregation of the first semantic similarity score, the first surface form dissimilarity score, and the first length consistency score according to the respective weights.

5. The method of claim 1, wherein selecting the quantity of candidate subject lines comprises:

ranking the plurality of candidate subject lines according to a soft majority voting scheme.

6. The method of claim 1, further comprising:

sampling the single exemplary subject line and the plurality of candidate subject lines using a decoding algorithm and a temperature control algorithm.

7. The method of claim 1, further comprising:

determining respective predicted engagement rates for the quantity of candidate subject lines based at least in part on using a performance testing service to evaluate the quantity of candidate subject lines with respect to historic performance data.

8. The method of claim 7, wherein causing the quantity of candidate subject lines to be displayed comprises:

causing the respective predicted engagement rates to be displayed in association with the quantity of candidate subject lines.

9. The method of claim 1, further comprising:

causing display of an alert message based at least in part on determining that one or more words in the single exemplary subject line are offensive or inappropriate, wherein the alert message comprises a first option to disregard the alert message and a second option to modify the single exemplary subject line.

10. The method of claim 1, wherein receiving the feedback comprises:

causing display of a feedback menu based at least in part on a mouse click event associated with an interactive user interface element; and receiving, from the cloud client, a selection of one or more options from the feedback menu.

11. The method of claim 1, wherein the dataset of annotated subject lines excludes customer data.

12. The method of claim 1, wherein the quantity of candidate subject lines comprises all of the candidate subject lines of the plurality of candidate subject lines.

13. The method of claim 1, wherein the feedback is received from the cloud client via a user interface or an application programming interface.

14. An apparatus for data processing, comprising:

at least one processor;

at least one memory coupled with the at least one processor; and instructions stored in the at least one memory and executable by the at least one processor to cause the apparatus to:

receive a single exemplary subject line from a cloud client of a content generation service, wherein the single exemplary subject line is a reference subject line for generation of candidate subject lines and comprises a first entity name;

generate a prompt for a hybrid machine learning model by interleaving soft tokens and hard tokens into an interleaved prompt;

generate, by inputting the interleaved prompt into the hybrid machine learning model of the content generation service and in response to receiving the single exemplary subject line from the cloud client, a plurality of candidate subject lines similar to the single exemplary subject line, wherein the hybrid machine learning model is trained using a dataset of annotated subject lines, and wherein generating the plurality of candidate subject lines comprises:

determining that an annotated subject line in the dataset includes a second entity name based at least in part on a set of markers in the annotated subject line that surround the second entity name;

adding at least a portion of the annotated subject line comprising the second entity name to a candidate subject line of the plurality of candidate subject lines; and replacing the second entity name in the candidate subject line with the first entity name extracted from the single exemplary subject line;

derive respective weights for a first semantic similarity score, a first surface form dissimilarity score, and a first length consistency score that correspond to an annotated A/B dataset, wherein the respective weights relatively maximize a rank correlation between the annotated A/B dataset and an aggregation of the first semantic similarity score, the first surface form dissimilarity score, and the first length consistency score according to the respective weights;

calculate a respective semantic similarity score, a respective surface form dissimilarity score, and a respective length consistency score between the single exemplary subject line and each candidate subject line of the plurality of candidate subject lines;

select, by the content generation service, a quantity of candidate subject lines from the plurality of candidate subject lines based at least in part on filtering the plurality of candidate subject lines according to an aggregation of the respective semantic similarity score, the respective surface form dissimilarity score, and the respective length consistency score that are associated with each candidate subject line and are weighted by the respective weights;

cause the quantity of candidate subject lines to be displayed at the cloud client; and receive, from the cloud client, feedback associated with the quantity of candidate subject lines and a selection of at least one candidate subject line displayed at the cloud client.

15. The apparatus of claim 14, wherein, to calculate the respective semantic similarity score, the instructions are executable by the at least one processor to cause the apparatus to:

use the hybrid machine learning model to perform a token-level comparison between the single exemplary subject line and each candidate subject line of the plurality of candidate subject lines.

16. The apparatus of claim 14, wherein, to calculate the respective surface form dissimilarity score, the instructions are executable by the at least one processor to cause the apparatus to:

use the hybrid machine learning model to perform a character-level comparison between the single exemplary subject line and each candidate subject line of the plurality of candidate subject lines.

17. A non-transitory computer-readable medium storing code for data processing, the code comprising instructions executable by at least one processor to:

receive a single exemplary subject line from a cloud client of a content generation service, wherein the single exemplary subject line is a reference subject line for generation of candidate subject lines and comprises a first entity name;

generate a prompt for a hybrid machine learning model by interleaving soft tokens and hard tokens into an interleaved prompt;

generate, by inputting the interleaved prompt into the hybrid machine learning model of the content generation service and in response to receiving the single exemplary subject line from the cloud client, a plurality of candidate subject lines similar to the single exemplary subject line, wherein the hybrid machine learning model is trained using a dataset of annotated subject lines, and wherein generating the plurality of candidate subject lines comprises:

determining that an annotated subject line in the dataset includes a second entity name based at least in part on a set of markers in the annotated subject line that surround the second entity name;

adding at least a portion of the annotated subject line comprising the second entity name to a candidate subject line of the plurality of candidate subject lines; and replacing the second entity name in the candidate subject line with the first entity name extracted from the single exemplary subject line;

derive respective weights for a first semantic similarity score, a first surface form dissimilarity score, and a first length consistency score that correspond to an annotated A/B dataset, wherein the respective weights relatively maximize a rank correlation between the annotated A/B dataset and an aggregation of the first semantic similarity score, the first surface form dissimilarity score, and the first length consistency score according to the respective weights;

calculate a respective semantic similarity score, a respective surface form dissimilarity score, and a respective length consistency score between the single exemplary subject line and each candidate subject line of the plurality of candidate subject lines;

select, by the content generation service, a quantity of candidate subject lines from the plurality of candidate subject lines based at least in part on filtering the plurality of candidate subject lines according an aggregation of the respective semantic similarity score, the respective surface form dissimilarity score, and the respective length consistency score that are associated with each candidate subject line and are weighted by the respective weights;

cause the quantity of candidate subject lines to be displayed at the cloud client; and receive, from the cloud client, feedback associated with the quantity of candidate subject lines and a selection of at least one candidate subject line displayed at the cloud client.

* * * * *